US010115154B2

(12) United States Patent
Lefebvre et al.

(10) Patent No.: US 10,115,154 B2
(45) Date of Patent: Oct. 30, 2018

(54) METHOD AND APPARATUS FOR INBOUND MESSAGE MANAGEMENT

(76) Inventors: Martin Claude Lefebvre, Los Altos, CA (US); Daniel Troy Doles, Saratoga, CA (US)

(*) Notice: Subject to any disclaimer, the term of this patent is extended or adjusted under 35 U.S.C. 154(b) by 481 days.

(21) Appl. No.: 13/353,305

(22) Filed: Jan. 18, 2012

(65) Prior Publication Data
US 2012/0191585 A1 Jul. 26, 2012

Related U.S. Application Data

(60) Provisional application No. 61/434,508, filed on Jan. 20, 2011.

(51) Int. Cl.
*G06Q 40/00* (2012.01)
*G06Q 10/10* (2012.01)

(52) U.S. Cl.
CPC ............. *G06Q 40/00* (2013.01); *G06Q 10/10* (2013.01)

(58) Field of Classification Search
CPC .... G06Q 20/10; G06Q 10/107; G06Q 20/102; G06Q 40/02; G06Q 20/108; G06Q 30/00; G06Q 30/0225; G06Q 20/227; G06Q 40/00
USPC ...................................................... 705/35–45
See application file for complete search history.

(56) References Cited

U.S. PATENT DOCUMENTS 5,903,880 A * 5/1999 Biffar .............................. 705/39
6,278,996 B1 * 8/2001 Richardson et al.
7,184,939 B1 * 2/2007 Trowbridge et al. ......... 702/193
8,355,967 B2 * 1/2013 DeBie et al. .................... 705/30
8,683,566 B1 * 3/2014 Gailloux et al. ................. 726/7
8,793,185 B1 * 7/2014 Hollier et al. .................. 705/40
8,862,675 B1 * 10/2014 Coomer et al. ............... 709/206
2002/0091829 A1 * 7/2002 Wood et al. ................... 709/227
2002/0198849 A1 * 12/2002 Piikivi ............................ 705/76
2004/0167820 A1 * 8/2004 Melick et al. .................. 705/16
2005/0049924 A1 * 3/2005 DeBettencourt ...... H04L 43/028
705/21
2006/0006226 A1 * 1/2006 Fitzgerald et al. ........... 235/380
2006/0080338 A1 * 4/2006 Seubert et al. ............... 707/100
2006/0230039 A1 * 10/2006 Shull et al. ....................... 707/6
2007/0011258 A1 * 1/2007 Khoo ................... G06F 3/0482
709/206
2007/0168228 A1 * 7/2007 Lawless ............. G06F 19/3418
705/2
2007/0208868 A1 * 9/2007 Kidd ...................... G06Q 30/02
709/229
2008/0104185 A1 * 5/2008 Oliver et al. ................ 709/206
2008/0288382 A1 * 11/2008 Smith et al. .................... 705/35
2009/0006233 A1 * 1/2009 Chemtob ........................ 705/35
2009/0259612 A1 * 10/2009 Hanson ......................... 706/47
2010/0268778 A1 * 10/2010 Kim ..................... G06Q 10/10
709/204

(Continued)

OTHER PUBLICATIONS

Michael's R3 Business Solution's Blog, May 2010.*

(Continued)

*Primary Examiner* — Chia-Yi Liu
(74) *Attorney, Agent, or Firm* — Haynes Beffel & Wolfeld LLP; Ernest J. Beffel, Jr.

(57) ABSTRACT

A computer-implemented method for identifying accounts with which an individual does business. The computer receives an access credential for at least one message source and analyzes a plurality of messages in the message source. From the analysis, a plurality of institutions are identified and a system account is created on the computer that is preloaded with the institutions.

21 Claims, 10 Drawing Sheets

(56) References Cited

U.S. PATENT DOCUMENTS

| | | |
|---|---|---|
| 2011/0067036 A1* | 3/2011 | Hickford et al. ............. 719/314 |
| 2011/0093367 A1* | 4/2011 | Stapleton ........................ 705/30 |
| 2011/0162047 A1* | 6/2011 | Reeves et al. .................... 726/4 |
| 2011/0172989 A1* | 7/2011 | Moraes ...................... 705/14.49 |
| 2011/0209196 A1* | 8/2011 | Kennedy ........................... 726/1 |
| 2011/0213657 A1* | 9/2011 | O'Malley et al. ......... 705/14.49 |
| 2013/0232159 A1* | 9/2013 | Daya et al. .................. 707/758 |

OTHER PUBLICATIONS

Access2000 The Complete Reference, Anderdson, © 1999.*
Bergman, et al., A Personal Email Assistant, Lab Report, Aug. 2002, 23 pages, HPL-2002-236, Hewlett-Packard Company, Palo Alto, CA, USA.
Faulring, et al., Agent-Assisted Task Management that Reduces Email Overload, Journal, Feb. 2010, 10 pages, ACM 978-1-60558-515- Apr. 10, 2002, IUI'10, Hong Kong, China.
Faurling, et al., A Demonstration of the RADAR Personal Assistant, Journal, 2008, 2 pages, Association for the Advancement of Artificial Intelligence.
Freed, et al., RADAR: A Personal Assistant that Learns to Reduce Email Overload, Journal, 2008, 7 pages, Association for the Advancement of Artificial Intelligence.
Garlan, et al., The RADAR Architecture for Personal Cognitive Assistance, Journal, 20 pages, International Journal of Software Engineering and Knowledge Engineering, World Scientific Publishing Company.
Kushmerick, et al., Activity-Centric Email: A Machine Learning Approach, Journal, 2006, 4 pages, Association for the Advancement of Artificial Intelligence.

* cited by examiner

METHOD AND APPARATUS FOR INBOUND MESSAGE MANAGEMENT

RELATED CASES

This is a non-provisional application of provisional application Ser. No. 61/434,508 by Lefebvre et al., filed 20 Jan. 2011, entitled "Method and Apparatus for Inbound Message Management".

BACKGROUND

1. Field

This disclosure is generally related to an inbound message management system that individuals use in order to manage communications from businesses with which they have relationships. More specifically, this disclosure is related to providing automated processing of the inbound communications to facilitate more efficient use of the communications by the individual.

2. Related Art

Programs and systems such as Quicken and Mint, now both owned by Intuit Inc., as well as PageOnce, can accept direct input of financial institution access credentials to allow aggregation of financial information for a household in a single place. Similarly, online bill payment systems from financial institutions such as Bank of America and USAA have provided integration with billers via direct input of individual, or household, access credentials for the bill payer's site. These tools may in turn rely on other systems such as Yodlee for interfacing with the financial institutions.

Other tools such as the Organizer product from Otherinbox can automatically analyze, prioritize and summarize emails coming into a user's inbox from institutions. Still other tools such as TripIt allow individual emails to be forwarded to a dedicated email address to facilitate presenting a single view of travel-related information.

Additionally, university research projects such as RADAR (See, e.g., "RADAR: A Personal Assistant that Learns to Reduce Email Overload," Freed, Carbonell, et al., 2008) have focused on providing virtual assistants for processing and handling email to assist in performing tasks related to those emails.

DETAILED DESCRIPTION

Overview

Figure 1:
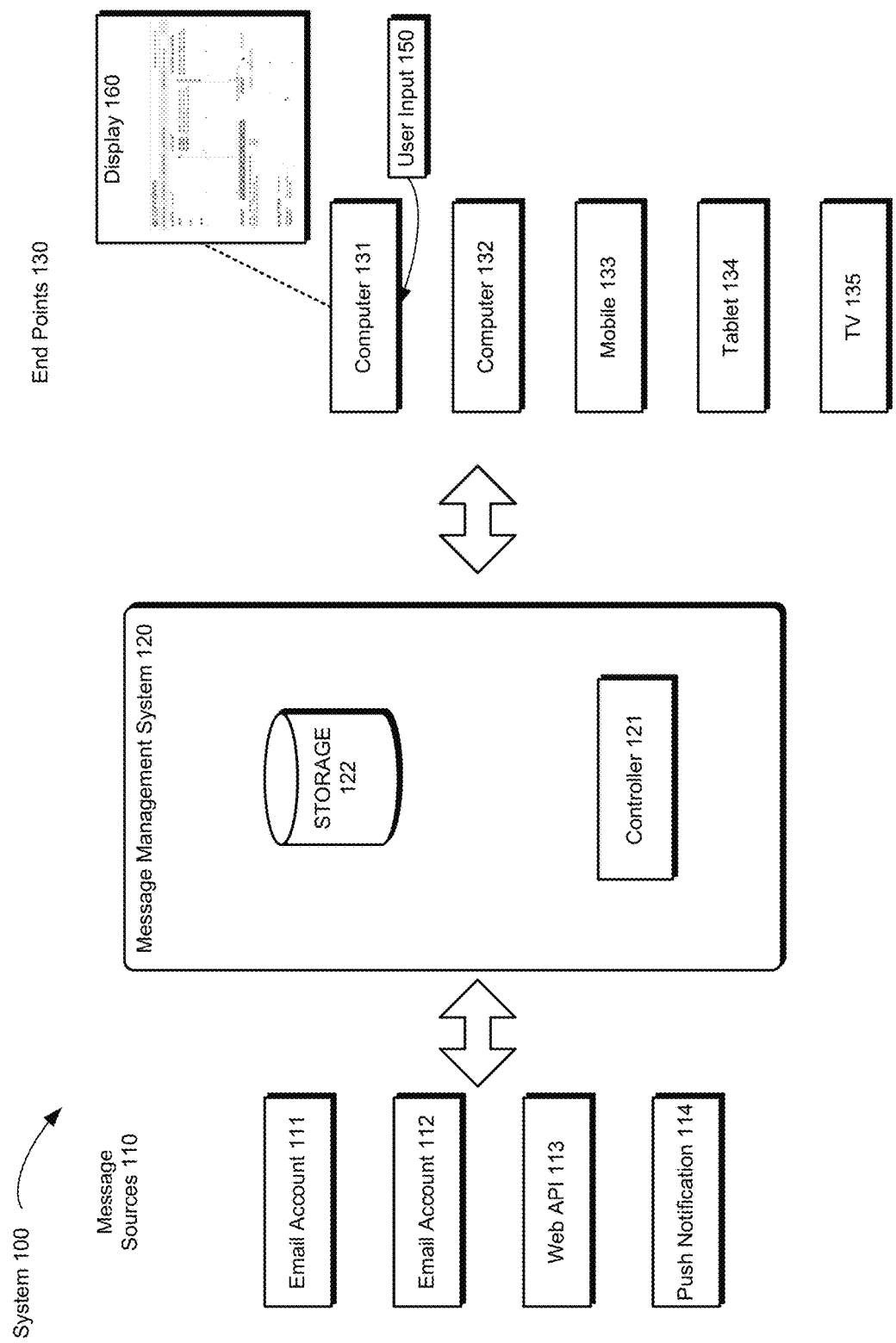
FIG. 1 shows an architectural level schematic of a system in accordance with an embodiment.

The discussion is organized as follows. First, an introduction describing some of the problems addressed by various embodiments will be presented, followed by an explanation of terminology that will be used throughout the discussion. Then, a high level description of one embodiment will be discussed at an architectural level along with a data model. Next, the user interface used by some embodiments will be discussed in conjunction with the details of algorithms used by some embodiments. Lastly, various alternative embodiments are discussed.

Let's consider the Doe household with two adults, John and Jane, and a college aged child, Sarah. The Doe household may have a wide array of relationships with financial institutions; billers such as utilities; brokerages; 401K companies; health care providers; retailers; insurance companies; and rewards programs. Information from these institutions may flow into a variety of locations: bills might primarily flow into Jane's personal email account; brokerage statements might flow into John's personal email account; travel plans for Jane's work into her work email; shopping reward credits into John's personal email; and, Sarah's debit card statements into her college email. It is desirable to provide a snapshot that encompasses more than just finances. Such a snapshot should include the wide variety of activities involved in running the Doe household.

We describe a system and various embodiments to provide a household management system with automatic institution account identification. This enables a user to allow the system to automatically setup and pre-populate the system with most of the institutions they interact with out the need to laboriously manually enter the account information, and access credentials, at startup. Additionally, the system's aggregation and organization capabilities may have the effect of causing users to opt in to more notices, coupons and other messages from companies because the system will aggregate and manage the information for them effectively.

Terminology

Throughout this specification the following terms will be used:

Registered User, or User: An individual who wishes to use the service registers as a user, e.g. registered user or user. To help with enabling the aggregation of household information, each registered user can be associated with one or more system accounts. Individuals can access the system using access credentials of their selection, e.g. username/password, secure tokens, one time passwords, OAuth (including variations such as Facebook, Gmail, Yahoo, etc.), and/or other authentication approaches. Once authenticated they can access the information about the system accounts with which their user is associated.

System Account: A system account is an aggregation of information about multiple registered users, providing the foundation for a snapshot of a household. Each system account may have a primary registered user who can add or remove additional registered users' access to the system account.

Institution: An institution is an entity, such as a company, with which registered users have relationships. Examples include banks, airlines, electric companies, phone companies, brokerages, mutual fund companies, insurers, health care providers, rewards programs, stores, online retailers, and the like.

Institution Account: An institution account is a representation of a relationship between a registered user and an institution, e.g., a bank account, a brokerage account, an Amazon shopping account, a Bank of America checking account, and a frequent flyer program account. Many institution accounts have a unique number, e.g. bank account number, rewards program number, Social Security number, email address. "Account" may be used as shorthand to refer to either institution accounts or system accounts, during this discussion, and the meaning will be apparent from the usage.

Online Identity: An online identity is a set of credentials that a registered user uses to access an institution account. A single online identity may provide access to multiple institution accounts, e.g. for the Doe family, John's username/password accesses all of the Bank of America institution accounts for John's Social Security number. Similarly, a single institution account may be accessible with multiple online identities, e.g. both Jane's username/password and John's username/password can access the joint bank account.

Payment Methods: A payment method is a representation of a method for system accounts to pay bills, such as the use of credit cards, online bill pay (OLBP) services accessed via a web browser or a mobile application, debit cards, electronic fund transfer (EFT) from an asset account, Paypal, pay-by-touch systems such as those that use near field communications, pay-by-mobile or cellphone, and manual payments. Payment methods facilitate use of the system account by registered users to pay institution account bills.

Message Streams: Each registered user can associate one or more inbound message streams with one or more system accounts. Once a user has established a message stream, the system imports and processes messages from known institutions. The list of known institutions is generally maintained in a master list for all users, but some embodiments may allow per-user customizations, as well as feedback provided by users of the system to update the master list. For push notifications and web APIs, relevant messages are imported. A message stream can be a representation of a message source. Herein, a message source may refer to the underlying message stream—the point being that a message stream can be held within the system, while a message source may be external, but for some uses, the difference is irrelevant.

System Overview

A system and processes to provide a household management system with automatic institution account identification are described. The system will be described with reference to FIG. 1 showing an architectural level schematic of a system in accordance with an embodiment. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes a system 100. The system includes message sources 110, message management system 120, and end points 130. The message sources 110 include email account 111, email account 112, web API 113, and push notification 114. The message management system 120 includes a controller 121 and storage 122. The end points 130 include computer 131, computer 132, mobile 133, tablet 134, and TV 135. Computer 131 is coupled in communication with a display 160 showing a user interface generated by the message management system 120 in accordance with one embodiment. Additionally, user input 150 to the computer 131 is shown.

The interconnection of the elements of system 100 will now be described. The message sources 110 are coupled in communication to the message management system 120 (indicated by double-headed line with arrows at end). The different sources may arrive via different mechanisms. For example, the email accounts 111-112 may be retrieved over a network, e.g. the internet, using one or more protocols, such as IMAP, POP, ActiveSync, Exchange protocol, MAPI. The web API 113 may be accessed over another network, or the same, e.g. private network, VPN, MPLS circuit, or internet, and may be any appropriate API, e.g. Yodlee, Quicken APIs, institution-specific API. Similarly, the push notification 114 may come over a network such as the internet or over an alternative network, e.g. SMS. All of the communications may be encrypted and, as appropriate, the decryption credentials may be available to the message management system 120 directly, or may be stored in storage 122 in encrypted form until additional input from an end point 130 provides the necessary decryption information, e.g. input of a decryption password from a user on an end point. Additionally a variety of authentication techniques such as username/password, OAuth, Kerberos, and more can be used for the communications. Loosely speaking, the message sources 110 can be viewed as either "pull" or "push" sources depending on how the data reached the message management system 120. For example, email account 111 might be accessed via IMAP over SSL in a pull fashion, e.g. controller 121 causes the email account 111 to be polled periodically and new messages retrieved. In contrast, email account 112 might be accessed via ActiveSync in a push fashion, e.g. the email account 112 notifies the controller 121 when new messages are available, optionally pushing them to the controller 121.

Controller 121 and storage 122 can be composed of one or more computers and computer systems coupled in communication with one another. They can also be one or more virtual computing and/or storage resources. For example, controller 121 may be an Amazon EC2 instance and the storage 122 an Amazon S3 storage. Other computing-as-service platforms such as Force.com from Salesforce, Rackspace, or Heroku could be used rather than implementing the message management system 120 on direct physical computers or traditional virtual machines. Communications between the potentially geographically distributed computing and storage resources comprising the message management system 120 are not shown.

The end points 130 are similarly coupled in communication to the message management system 120 (indicated by double-headed line with arrows at end). This communication is generally over a network such as the internet, inclusive of the mobile internet via protocols such as EDGE, 3G, LTE, WiFi, and WiMax. The end points 130 may communicate with the message management system 120 using HTTP/HTTPS protocols and may be implemented in one embodiment using a web interface or application to enable easy support of a range of end point device types. The mobile 133 can be any mobile device with suitable data capabilities and a user interface, e.g. iPhone, Android phone, Windows phone, Blackberry. The tablet 134 can be any tablet computing device, e.g. iPad, iPod Touch, Android tablet, Blackberry tablet. The TV 135 can be a TV with built in web support, for example Boxee, Plex or Google TV built in, or can be a TV in conjunction with an additional device (not shown and often referred to as a set-top box) such as a Google TV, Boxee, Plex, Apple TV, or the like. According to some embodiments, the end points 130 are any web-enabled device supporting reasonable full HTML rendering, and the feature set available on a device may be limited depending on the HTML rendering capabilities. In other embodiments, a custom, or native, user interface is prepared for the device, e.g. a device with a more limited web browser but a native widget set might receive a custom application. Similarly, some recent mobile devices, tablet devices, and TVs support an "application store" concept and custom applications could be targeted at such embodiments. In certain situations, the environment may be executing remotely and rendered on the TV, e.g. cable headed computers execute the application and cause the display to be rendered and process user inputs passed back over the system. The display 160 is coupled in communication with the computer 131 and the computer 131 is capable of receiving user input 150, e.g. via keyboard, mouse, track-pad, touch gestures (optionally on display 160).

The communication is often bidirectional with the end points 130 directly making requests to the message management system 120 and the message management system 120 directly making requests to the message sources 110.

Figure 2:
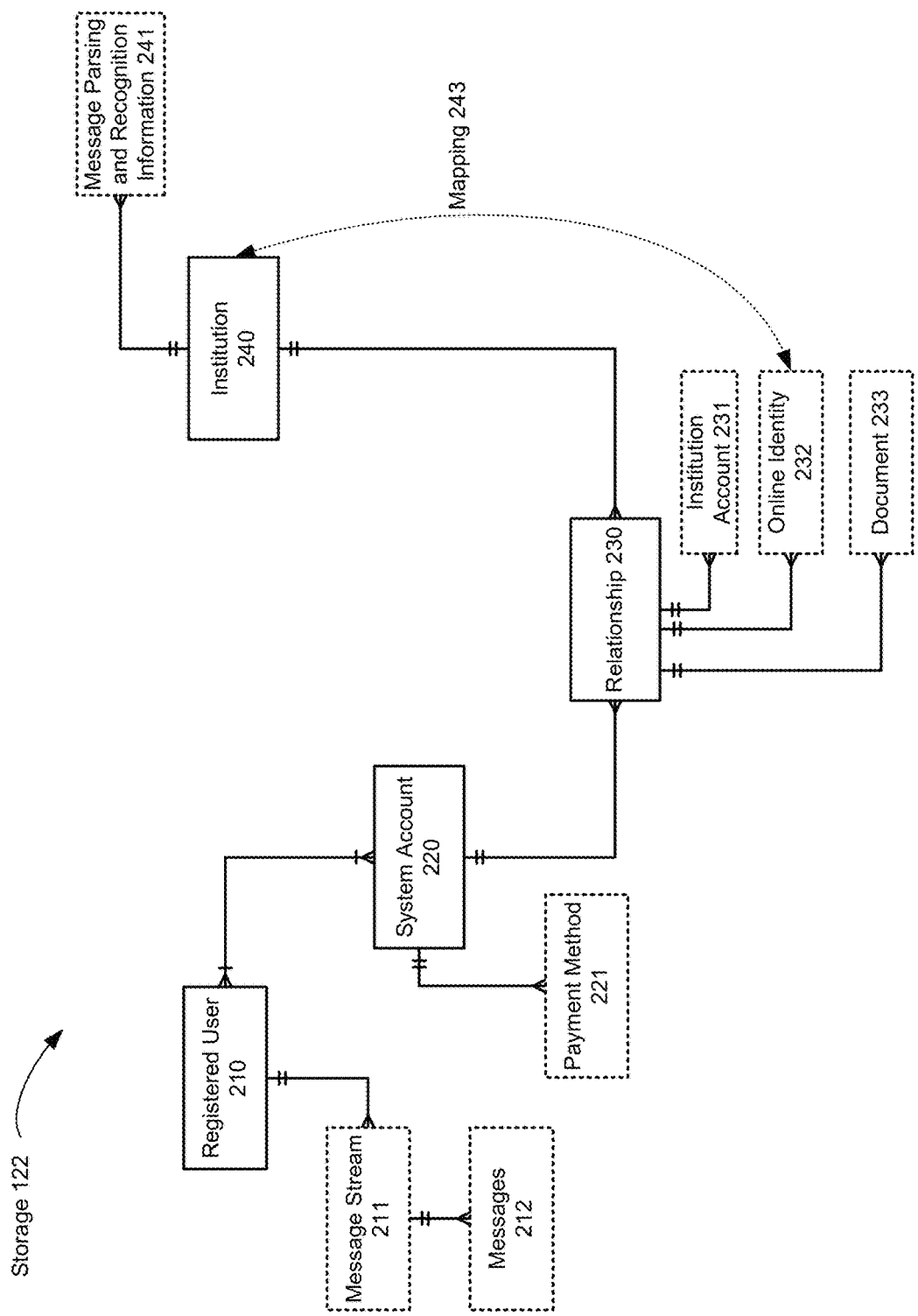
FIG. 2 shows a high level view of the data model of a system in accordance with an embodiment.

Having described the elements of FIG. 1 and their interconnections, the system will be described in greater detail in conjunction with FIG. 2, showing a high level view of the data model of a system in accordance with an embodiment.

FIG. 2 shows the relationship between registered users 210, system accounts 220, relationships 230, and institutions 240. The lines between these boxes, together with the notations at the line ends, describe the cardinality of the relationships, e.g. each registered user 210 is related to one or more system accounts 220; each system account 220 is associated with many relationships 230, but each relationship 230 is associated with exactly one system account 220. The singular and the plural are used interchangeably in discussing the elements of FIG. 2 for clarity to better focus on describing the data model which the diagram clearly describes. Dotted boxes are used to highlight additional types of associated data in the data model, e.g. message streams 211, messages 212, payment methods 221, institution accounts 231, online identities 232, documents 233, and message parsing and recognition information 241. Additionally, not shown, a mapping 243 is maintained between online identities 232 and institutions 240.

FIG. 2 is only one possible data model used by an embodiment; other data models may be used. It should be understood that the data model in FIG. 2 can be implemented in one or more databases, object relational mapping (ORM) systems, and/or any other appropriate data storage. If a SQL-style database is used, each box loosely corresponds to a table with rows of the tables containing the appropriate contents. For example, the registered users 210 could be stored as a table with one row per registered user, and an intermediate table would be used to connect the registered user table with the system accounts table to support the many-to-many relationship. In other data storage approaches, intermediate tables might not be required, and for that reason such intermediate, or join tables, are omitted from the data model of FIG. 2. The data and data model of FIG. 2 can be stored in the storage 122 and managed by the controller 121.

The storage 122 includes both institution data and user data. The institution data can include email domain names and addresses (institutional whitelist), as well as a collection of rules used to analyze emails originating from that institution. The user data can include a list of business relationships associated with each system account. Each relationship 230 can include the name of the institution, a list of institution accounts 231 that the registered users associated with that system account have established with that institution, online identities 232, and documents 233. In this embodiment, payment methods 221 can be associated with system accounts 220. This can facilitate easier bill payment, e.g. you usually pay your phone bill with your Bank X Credit Card.

Additionally, the information about institutions 240 can include information to handle proxy delivery services. Example #1: Schwab and other brokerages use a service to send out certain proxy materials. Emails come from id@proxyvote.com. Emails received from proxyvote.com can be associated with the original institution (in this case Schwab) and processed as such. Ultimately, actions can be proposed and/or taken with respect to these email, helping manage that user's household. Example #2: Bank of America offers a service called e-bills. Users of the service receive notices from Bank of America when their bills come due. These notices can be associated back to the appropriate billing institution to make sense to the end user. Such linkages can use a mixture of account information from the proxied emails, as well as optional manual corrections and/or adjustments by registered users.

Returning to the description of the system 100, we will focus on the initial setup and first use of the example Doe household of John, Jane and their college aged child, Sarah to motivate the operation of the system. A household member, Jane, connects to the system 100 via an end point 130 such as computer 131 using a web browser, e.g. Chrome, Firefox, Internet Explorer, or Safari, and becomes a registered user. Once registered, Jane establishes the Doe Family system account. This information is stored by the controller 121 in the storage 122. Next, Jane provides login information for one message source 110, e.g. her personal GMail email account, email account 111. The controller 121 can then access the email account 111 and begin to automatically identify the household's institution accounts, discussed in greater detail below, and create a dashboard for the household. Later, John can become a registered user and associate his message streams, e.g. email accounts, with the Doe Family system account. Additionally, the parents can create a second system account for their college aged child, Sarah, e.g. "Sarah's Accounts," which both they and she can monitor.

Throughout this example, computer 131 will be used as the endpoint 130 and the users can view the output of the system on the display 160 and can interact with system by providing user input 150 to the computer 131. That user input 150 may be communicated by the computer 131 to the message management system 120 to eventually cause an update to the display 160.

As shown in FIG. 2, the contents of the messages can be stored in the message stream 211 associated with a specific registered user 210. This provides the system account, or Doe Family in this example, access to the messages without requiring sharing, among household members, of passwords or access credentials.

Additionally, display settings for the underlying messages may be available in some embodiments. In one embodiment three display settings are available for each message: joint, shared or private. This information is used, along with message ownership information, to control the display of objects in the user interface:

Joint—all registered users of the system account have equal control and access to all the information (emails and documents) that is not segregated by user—this can be useful, for example, for alerts and snaplets (both described below).

Shared—all registered users see the information in their dashboards, but only the message recipient can control the display status—this can be the choice for content displayed in the tracker (see description of FIG. 3, below).

Private—only the registered user to whom the message was directed can view the message in their user interface—this can be used for promotions and newsletters (see description of FIG. 3, below).

The specific display settings can be varied in different embodiments. It is valuable to have default display settings for different message types and/or institution type that can then be further customized by users. The display settings serve to limit clutter and thus better manage users' attention budgets. If only Jane is interested in promotions and coupons that she signed up for, cluttering the Doe Family user interface for John with those promotions would not be helpful. In some embodiments, the settings may also serve a security function.

For "pull" oriented message sources 110, the message management system 120 may periodically access the message sources 110 to obtain new information. The polling rate may be set automatically by the system and, in some instances, may be further customized by registered users, e.g. check my email every 15 minutes. During the pull process, relevant messages are imported into the message stream 211 for that registered user 210. See below for further discussion of email processing. For "push" oriented message sources 110, the message management system 120 can respond to push notifications by storing relevant messages into the message stream.

The message management system 120 processes the message streams 211 for a system account 220 to create a unified dashboard that can be viewed on the end points 130. One or more types of summarized versions of the message may be created for each original message according to one embodiment: alerts and snaplets.

Alerts can be used to represent certain messages in displays on end points 130. Alerts are used for displaying important information in messages in a way that allows the end user to review their message contents without navigating to each message and having to click/touch through each one. In some embodiments, alerts can be used for messages that contain account activity information that generally does not require follow up. Examples could include: welcome messages, password changed, new biller created, account activity, new PIN confirmed, deposit posted, periodic summaries, bill reminders, proxy materials, many travel related messages, stock quotes, stock alerts, and social network notifications (e.g., Facebook, Twitter, LinkedIn notifications). In some embodiments, social network notifications are separately categorized from other types of alerts. In contrast, in some embodiments, snaplets require user action to complete a task, e.g. pay a bill that is due, complete a purchase such as a Groupon coupon, vote proxy materials, obtain a document, renew driver's license/registration/prescription. Additionally, snaplets can be more heavily formatted to extract key actionable data such as amounts/due dates, whereas alerts may retain the original text, while stripping out formatting and boilerplate to enable easy scanning.

A snaplet is a text or media message transformed and/or extracted into formatted data with fields specifically extracted from the message. The extracted fields are system defined for a given message type. A snaplet is formatted by identifying a relevant message, extracting key information for that type of message and storing it in a structured format. An alert is a text or media message transformed and/or extracted into text with most formatting and boilerplate removed either by summarizing the original message or extracting key textual elements.

Some sample alerts are shown here:
Example Alert #1:
Chase: Your Daily Account Summary
From Chase Feb. 12, 2010 '4567
End of day balance: $2,164.61
Total deposits: $0.00
Total withdrawals: $0.0
Example Alert #2:
Chase: Your Set Transaction Amount
Exceeded Alert From Chase Card Services
Feb. 11, 2010 1234
A transaction exceeded ($ USD) 1.00.
Example Alert #3:
Chase: Your ATM Withdrawal Feb. 11, 2010 '4567
A $120.00 ATM withdrawal exceeded your
$100.00 Alert limit.

As you can see, this format for messages is suitable for easy scanning or swiping on a touch device without the need to manually providing input to go from message to message. Consider some snaplets in contrast; the fields from each snaplet enable easy composition into a single line actionable representation of the underlying message on end points 130:

PAYMENT CalWater '1234 $113.14 Due: Feb. 22, 2010
PAYMENT PG&E '29-6 $731.48 Due: Mar. 1, 2010
CHECKIN Southwest SFO-LAX 2:15 pm On: Feb. 14, 2010
DOWNLOAD MorganStanley '3456 Sent: Feb. 18, 2010

These samples highlight the value of snaplets because they indicate a clear action for the user to take with a specific account. Like alerts, snaplets are designed for easy scanning; however, a higher degree of reformatting has pulled the most crucial information out. Additionally, the bold faced text may be a link, or button, to launch task assistance, discussed below, for easily completing the snaplet's required action.

In summary, the architecture of system 100 and the components and mechanisms through which it affords an easy way to provide a household management system with automatic institution account identification is described. Additional aspects of the system will be described in greater detail with reference to the sample user interface screens and process flow diagrams in the subsequent figures.

User Interface

The system, in accordance with an embodiment, will be discussed with reference to FIGS. 3-9 showing the user interface of one embodiment. These user interfaces could be displayed on the display 160 coupled to computer 131 or other displays associated with other end points 130.

Before looking at specific user interface examples from one embodiment, a conceptual overview of some of the approaches used by different embodiments will be presented. Conceptually messages can be presented in a number of different areas according to several representation approaches:

| Representation Approach | Sample Types of Messages |
| --- | --- |
| Snaplets | Actionable emails (see discussion of hot list 310, below) |
| | User defined tasks (e.g., when user requests creation of a task from an alert or message) |
| Alerts | Informational messages (see discussion of alerts 305, below) |
| Inbox entry | Tracker type informational messages (see discussion of tracker 330, below) |
| | Newletters (see discussion of newsletters 340, below) |
| Large thumbnail | Messages with large images, generally promotional emails (see discussion of promotions 350, below) |
| Structured Data | Account balances (see discussion of account info 320, below) |

Two of the representation strategies (snaplets and alerts) were discussed above. Inbox entries hew more closely to the original formatting of the message with less computer analysis and/or editing. Large thumbnail representations "pop" the large image(s) from promotional-style emails to stand out either by displaying the single image or by presenting the main image portions of the email. Structured data corresponds to presenting information from the data model about the status of system accounts 220, or other data sources, e.g. current account balance. By selecting default representations for different types of messages and then grouping messages into defined areas of a user interface, the system can translate what could otherwise be email overload into an intuitive user interface for prioritizing user attention and managing a household. One such approach is discussed in connection with FIG. 3.

Figure 3:
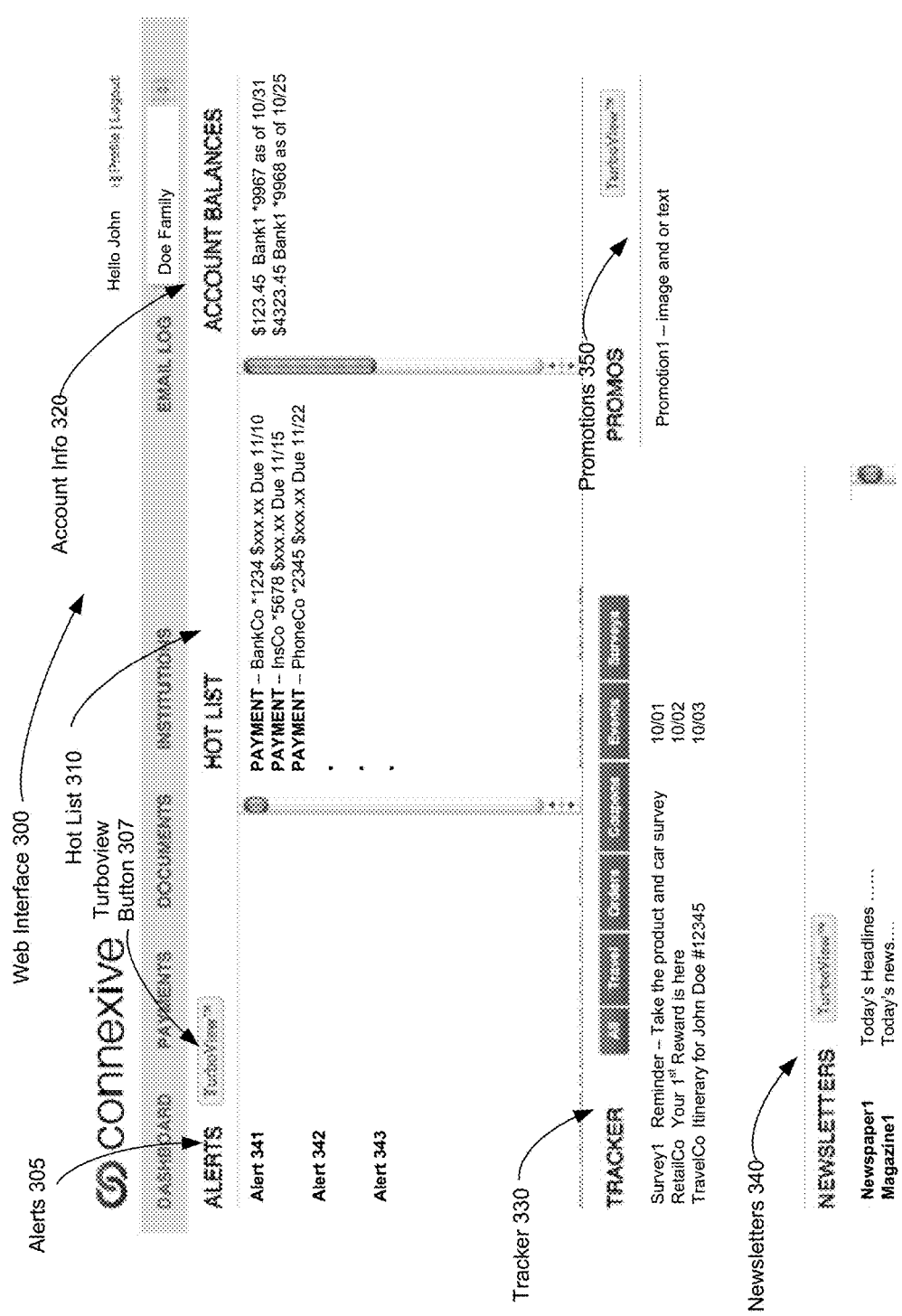
FIG. 3 shows a user interface for an embodiment.

FIG. 3 shows a user interface for one embodiment of the system. Specifically, web interface 300 (for simplicity, shown without much of the browser or operating system user interface elements). This web interface 300 shows a dashboard view with registered user John logged in to the Doe Family system account. The user interface has been divided into several regions to provide a dashboard. Each region is using one representation approach (see above) to display similar types of messages in a format that enables easy action: alerts 305, hot list 310, account info 320, tracker 330, newsletters 340, and promotions 350.

Alerts are initially considered unread until moused over, or "touched," in the alert region, e.g. alerts 305. In one embodiment, the display persistence of alerts is 30 days if unread and one hour after being read, e.g. the period of ready accessibility in the area for alerts 305. If the user or the system deems that contents of a message in the alert area to be suspicious, then a task to follow up with the originating institution can be created. Such a task can be represented as a snaplet for followup and shown in the hotlist 310. The contents of alerts and the formulation from original messages were described above. A user can access the full original message from an alert using the user interface, e.g. contextual menu, click, touch gesture. In some embodiments, when the user provides user input on an alert, the original message can be displayed either as a framed overlay, in another window, or in some other fashion. Additionally, a turboview button 307 allows easy access to a view for quickly reviewing all messages associated with the current alerts 305 and will be discussed below.

The message viewer (not shown) allows viewing of an individual email message from an alert, or other part of the user interface. In one embodiment, a default set of message actions include: adding the message to the tracker 330 (conceptually this can be viewed saving the item as a clipping for later access, e.g. travel documents (accidently) displayed in alerts 305), and add to hotlist 310 (this creates a snaplet from the message for followup). In some embodiments, snaplets (or messages in other formats) can be created by one user for the benefit of another user sharing the same system account. This can be useful, for example, to draw one's attention to a particular promotion, alert, payment, or document contents, etc. In some embodiments, the actions described here for the message viewer may be directly available from the web interface 300 in the alerts 305 area. In the message viewer or the alerts 305 area, conditional or contextual actions may be available to the user based on system assigned tags attached to the message beyond the ones described above. For example, if the message is tagged as containing an invitation to an event, the end user could be given event appropriate options such as RSVP now, RSVP later, or Ignore. Additionally, based on information from access to multiple users' email streams, hyperlinks may be selectively filtered against either public phishing lists or a private whitelist based on known domains for institutions. In some embodiments, snaplets might interact with a user, or users, of a system accounts calendar by adding appointments, forwarding messages to another member of the household.

As discussed above, messages that require action from the user may be displayed in the form of a snaplet and in this embodiment are displayed in the hotlist 310. In one embodiment, snaplets persist until dismissed by the user. Snaplets can also be dismissed by the user without being acted upon. Exemplary types of snaplets include:
  Payment due, e.g. pay a bill that is due
  Document, e.g. retrieve a document such as annual credit card summary, statement, tax document
  Call or followup actions, e.g. overdraft, stock watch alerts, possible fraud
  Vote, e.g. complete voting your proxy in a shareholder, or other matter
  User generated action such as read, review, or approve, e.g. in response to a user generated task created around a document or statement, or buy a new TV
  Travel, e.g. approve flight changes
  Sign, e.g. sign a document
  Check-in, e.g. check in for travel
  RSVP, e.g. respond to an invitation or calendar event
  Refill, e.g. for a prescription drug
  Validate, e.g. to complete a required validation of an account creation where a link might need to be followed
  Send card, e.g. to send a card to (close) friends and relatives whose birthdays are in your calendar
  Profile and password changes, e.g. updating your profile or password at a site in response to a request from the site
  Reminders, e.g. any system or user defined reminder set for a later date, such as to make a phone call or look for a document
  Generated recommendations, e.g. "Review your insurance coverage" that might lead to an affiliate marketing opportunity, etc.

Some embodiments provide task assistance to facilitate completion of the actions from the snaplets represented in the hot list 310. Some embodiments feature:
  Banking—Some embodiments support linking directly to bill payment, extracting e-billing information from banking websites to coordinate with message stream, and/or scheduling specific tasks for a later date.

Stock or Brokerage—In some embodiments, the financial institution website is visited and information extracted to assist in matching a transaction to emails and announcements. This, in turn, can help with de-duplication, e.g. identifying that you are getting three or four emails about the same trade. For example, in one embodiment the processing includes identifying two or more common data points across multiple messages, e.g. account number, date, amount, stock ticker, and/or using information about proxy email senders to identify duplicates. For example, if two messages refer to the same account and have the same amount, in one embodiment they could be treated as duplicates and only one of the messages surfaced in the dashboard views provided by the user interface, e.g. single alert and/or snaplet.

Shopping—(Extended) warranty manager to keep track of receipts from Amazon and other stores; track and optionally hold digital downloads either on the site or on a third party site; tracking store credits and expirations; tracking store coupons and assisting in the use of coupons at vendor sites.

In some embodiments, one part of task assistance is prioritization of the order of snaplets within the hot list 310 representation. By ordering the most important tasks or actions that a user should take first, e.g. bills due before voting a shareholder proxy. Other embodiments include specialized task assist user interfaces (not all shown) for making payments (shown), inserting documents, travel planning, trading, system account setup, and user defined projects. In some embodiments, task assistance includes launching task appropriate applications on the end point 130, e.g. launching the Bank of America application on your mobile phone for working with Bank of America accounts.

In some instances, task assistance may happen automatically with no, or minimal, user interface visible representation. For example, automatically forwarding trip information to a service such as TripIt. In some embodiments, rules can be defined to control automatic task assistance, e.g. only forward my trips, forward all trips. These rules can be predefined in the system or defined by users. Additionally these rules can be automatically selected for some kinds of institution accounts or tasks, optionally selected by the user on a per-institution account basis or per-task basis. For example, when I receive a message from institution account XYZ, automatically download the attachment from the XYZ website or access a Dropbox folder called "XYZ Account" to locate the newest PDF file. Similarly, there may be options to put a note or icon next to the message to indicate that the task has been completed.

Another example would be tracking information. In some embodiments, the system automatically identifies tracking numbers in the message stream and then queries, scrapes websites, and/or requests periodic message updates from the shipper to track the package status.

Figure 4:
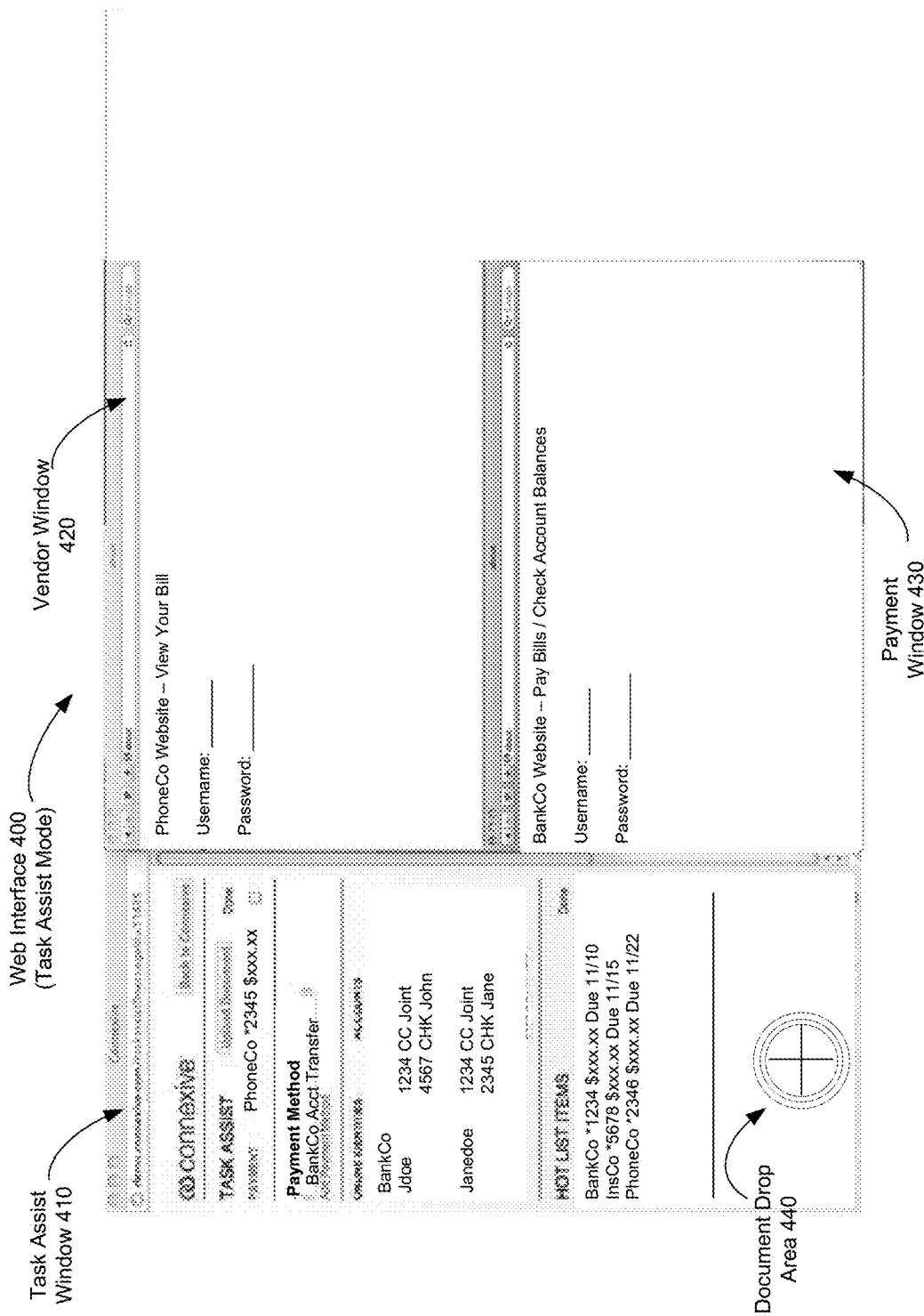
FIG. 4 shows a user interface for an embodiment in task assist view.

One possible framework for thinking about task assistance capabilities involves using a two-by-two matrix of possibilities:

|  | Automated | Assisted |
| --- | --- | --- |
| State change | No user interaction required; some impact on other institution accounts/world, e.g. TripIt website updated, bill | System guides user to complete a task; some impact on other institution accounts/world, e.g. manually pay bill as shown |
| Non-state change | automatically paid from default payment account No user interaction required; no change to other institution accounts, e.g. check and report shipping status | in FIG. 4 using system to assist Some user interaction required; no change to other institution accounts, e.g. bring you to a login page to check your reward balance |

In some embodiments the system provides task assistance across the full matrix of possible types. In other embodiments, only a subset of type of task assistance are provided. In some embodiments, the automated types of task assistance for state change activities can be disabled by users who prefer assistance over automation.

Where appropriate, the snaplets may be integrated into third party calendar systems or task systems, e.g. Exchange, Google Calendar, Basecamp, Remember the Milk, to place due dates into a person's calendar or task lists. These in turn may allow easy launching of the system's task assist features, described below, to complete the task.

Consider for example, receiving a $3 credit from Amazon.com for an electronic download. Presently, the individual may have multiple messages in email and/or their Amazon account about this credit. Those messages may be represented and stored in the tracker 330. However, the system can also track the credit and warn the user when the credit is going to expire if it has not been used. For example, in one embodiment, when messages about credits are received, an alert in the alerts 305 or a snaplet in the hot list 310 can be created X days prior to the expiration to remind users about the credit. Additionally, the credit can be shown in the account information 320 portion of the user interface discussed next. This sort of unification and organization of the multiple message streams for multiple institutions and automatic tracking provides an improved experience for users.

Continuing to discuss the regions in the web interface 300, the next region is for account balances and information (account information 320). Balances for bank accounts, credit cards, loan accounts and rewards accounts can be aggregated in this region. In some embodiments, items to track for each type of account may include:

Bank: account balance, source and date of last update

Credit card: current account balance, source and date of last update; last statement balance, date of last statement; current minimum payment due, due date Loan: account balance, date of last payment, amount and date of next payment Rewards: account balance, source and date of last update, expiry date Credits: store credits and expiration dates The range of information available will vary depending on the message sources 110. For example, if the reward messages from United Airlines do not include a points expiration date, then that will be omitted (or extracted from the United Airlines web site in some embodiments). In contrast, if American Airlines or Best Buy includes that information, then that information can be included. Additionally, since this information is obtained from reviewing message sources 110, registered users may desire to opt in to additional messages from institutions they interact with to improve the quality of information available to the system.

In some instances, the user may provide the credentials for accessing an institution's data directly, e.g. via a web API or other API. In such an instance, the collected information might be more frequently updated without the need to receive a message.

Continuing to the next region, the tracker 330 includes messages that do not require immediate action but which are likely to be referenced in the future. In one embodiment, messages in this area are represented as inbox entries to allow full review of the message. For example, travel plans, earning of rewards in loyalty programs, coupons, surveys, shipment information, etc. In some instances, the system may take automatic action based on the messages, for example:
- automatic submission of travel confirmations to TripIt or similar services
- automatic tracking of shipments based on shipping confirmations
- integration with third party calendar and task management such as Exchange, Google Calendar, Basecamp, Remember the milk.
- automatic reminders for coupons about to expire, approaching events, etc.

The grouping of the totality of a household's messages into these regions of the web interface 300 is quite helpful, because information of different priorities is grouped for simplified review and set up for the user to cause actions to occur.

In the next region, the newsletters 340 includes newsletters a family member has elected to receive, e.g. investment reports, daily newsletters, etc. In some embodiments, news feeds such as RSS and Atom may be supported.

Finally, the next region, the promotions 350 can include advertising from the user's email stream. In some embodiments, the operator of the system 100 may charge a fee to promote the advertising of certain companies. In such an embodiment, sometimes referred to as a correlated advertising, only those promotional messages from companies with a relationship with the system operator are displayed in thumbnail format in the promotions area 350. If there is no relationship, the promotion message might be housed in the coupon area of the tracker 330 as an inbox entry. The system can also take into account which user signed up for the promotions. For example, if Jane has signed up for Macy's coupons, they could appear as large thumbnails in the region for promotions 350 if Macy's is a partner with the system operator or in the coupon area of the tracker 330 if not. In other embodiments, the operator of the system may use the region to display its own promotional advertising. This might enable the operator of the system to make revenues without subscription fees. Additionally, as noted in one embodiment, the promotions are user account specific so Jane does not see John's promotions and vice versa. In still other embodiments, the users might select which institutions' promotional messages are displayed in the promotions 350 area (irrespective of any correlated advertising).

The web interface 300 as shown can be displayed on a laptop or desktop computer, e.g. computer 131. Other configurations of the interface may be used in other computing environments such as mobile phones, tablets, or TVs. Each region of the web interface 300 can, for example, be a task or activity that could be separately touched to bring up the appropriate contents as the primary view. Additionally, the ordering of the regions of the web interface 300 may be user customizable and/or defined by the system operator.

This discussion of one embodiment highlighted several concepts underlying the system. Multiple messages from multiple message sources are obtained by the system. The system analyzes the messages and based on the type of message selects both a display format (snaplet, alert, inbox entry, large thumbnail, structured data) and placement of the formatted version of the message into an appropriate region of the user interface for easy action, review, and/or later retrieval. These regions group all message of a similar type for easy action. Summarizing the different regions in the web interface 300 of FIG. 3:

| Region of Web Interface 300 | Summary |
| --- | --- |
| Alerts 305 | Review one time, important and time sensitive items. Represented as alerts. Persist until reviewed or timed-out. |
| Hot List 310 | Actions that persist until completed by the user, usually highly important and time sensitive. Represented as snaplets. |
| Account Info 320 | Extracted information about a household's account for easy reference. Represented as structured data. Persists until the next update. |
| Tracker 330 | Stores information for future reference and easy review in a timely manner, generally one time. User can easily flag items for follow up as needed. Represented as inbox entries. Items persist until they are no longer relevant (e.g. once an order has been received, travel completed, events passed, etc.). |
| Newsletters 340 | Review at user's leisure. Represented as inbox entries. Items persist for a pre-determined period of time. |
| Promotions 350 | Review if interested in content only. Represented as large thumbnails. Persist for a pre-determined period of time. |

Turning to snaplets and task assist, FIG. 4 will be considered. FIG. 4 shows a user interface for an embodiment in task assist mode.

FIG. 4 includes a web interface 400 (for simplicity, shown without much of the browser or operating system user interface elements). In this embodiment of task assist, the web interface 400 takes the form of three independent browser windows; however, frames of a single window and/or separate regions within an application could be used as well. The three windows include the task assist window 410, the vendor window 420 and the payment window 430. In some embodiments, the task assist web interface 400 is displayed the user triggers the snaplet, e.g. clicks on a link or touches a snaplet for more detail from the hotlist 310.

The goal of the task assist web interface 400 is to provide guidance to the user in achieving the task. For this reason, the task assist user interface will depend on the nature of the task, e.g. make a payment, check-in for a flight, retrieve a document. In this example, it is paying a bill to the PhoneCo for the Doe Family system account. In one embodiment, the vendor window 420 and payment window 430 may have the online identity information pre-populated, e.g. if a web-based password wallet, or vault, is being used. In other embodiments, the information in the task assist window 410 merely prompts the user to help them recall their login information, but the user must manually enter their passwords or access credentials.

The task assist window 410 may include several useful pieces of information: online identities relevant for the vendor/payment method; password or password hints; valid payment methods; last used payment methods; amount to be paid and due date; and a list of missing documents for document activities.

For example, clicking on "PAY" next to PhoneCo in hot list 310 brings up the windows shown in web interface 400 including the online bill pay website of the account normally used to pay this particular bill and/or the PhoneCo website if the user typically pays this bill directly with a credit card or bank transfer, or if the user wishes to review the bill on the PhoneCo web site prior to making the payment on the online bill pay website. The behavior can be adapted based on the payment method attached to this account, either explicitly or based on recent payment methods. The particular option can be selected by the user or predefined by the system. The persistence of the preferred, last, and previously used, payment methods for different bills is useful for ensuring the display of the correct payment website and/or tools. In some instances, task assistance may permit one household member to make a payment using a card, or bank account, for which they do not directly know the access credentials.

For example, consider the case where Jane prefers to use her personal credit card to pay her cell phone bill, but John does most of the bill payment. Jane can set up the system account to enable the cell phone bill to be paid with her personal card without providing John the password to her credit card company web site. The task assist functionality may include capabilities log in to payment web sites to facilitate this functionality.

Additionally, note the document drop area 440 on the task assist window 410; this can be used to easily drag-and-drop a bill, e.g. PDF, web clipping, picture, text, confirmation information, from the user's computer or a website for storage in the household system account or to another third party website selected either by the end user or the system operator. In some embodiments, the uploaded items are automatically associated with the relevant accounts and/or bills.

Also take note of the additional snaplets of "Hot List Items" in task assist window 410. In one embodiment these are the other action items that can be completed while at this vendor or bill payment website. For example, if you are using "BankCo Acct Transfer" as the payment method for another credit card and an insurance bill those can be listed here for easy completion.

In some embodiments there are specialized assist functionalities for: payments, document retrieval and/or storage, travel, banking, trading, and system setup. In another embodiment, the system includes a web clipping functionality to enable notes, payment confirmations, and other materials to be captured and stored with the record of completing a task. In some embodiments, the system can store this information on online storage sites such as Dropbox, Evernote, or Amazon S3.

Figure 5:
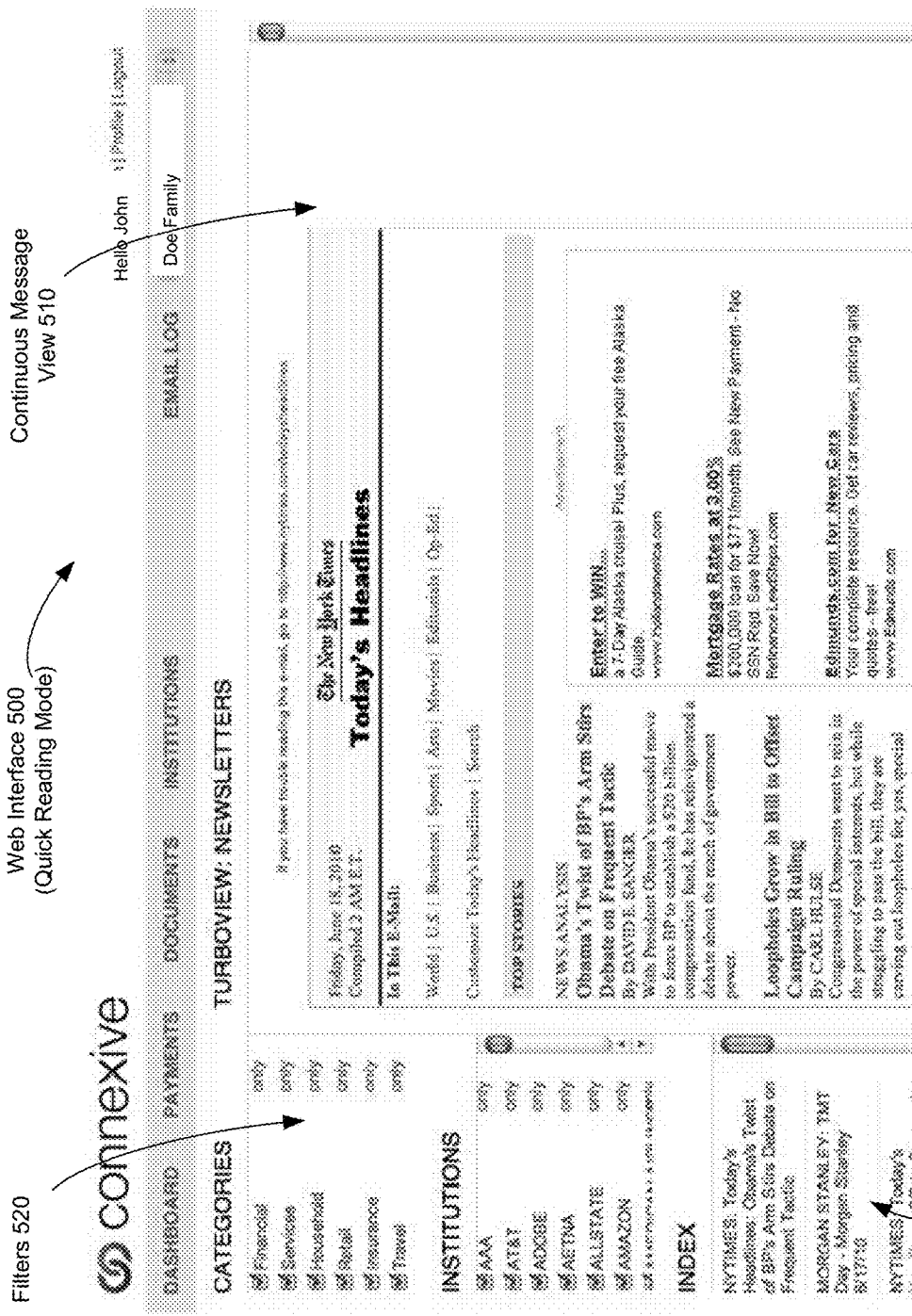
FIG. 5 shows a user interface for an embodiment in quick reading view.

FIG. 5 shows a user interface for an embodiment in quick reading view. In some embodiments, this view can be triggered by clicking on a turboview button such as turboview button 307.

The web interface 500 for the quick reading view includes three main regions: filters 520 (shown as two regions in this example: one for filtering in or out by categories of items, and the other for filtering in or out by institution), an index 530 (to browse the alert form of the messages), and a continuous message view 510 (to read the full message). Designed for fluid, or continuous, scrolling, the continuous message view allows a user to easily browse a large number of messages such as newsletters without needing to click regularly. In embodiments for touch-based user interfaces, gestures can easily scroll the continuous message view 510. Additionally, the system can maintain a "read" status for messages, as discussed in connection with alerts earlier; read items may be hidden from view after a short default period, e.g. one hour or less, while unread items might be kept in view longer, e.g. 30 days or a user selectable period. The filters 520 allow for an easy search, e.g. find everything that Morgan Stanley sent me recently, or show me all of my coupons. This is a important type of filtering, that in some embodiments is driven by the message acquisition and classification, described below.

Although two types of filtering are shown in this example, other types are possible depending on the method of invocation. For example, if alerts 305 vs. newsletters 340 is used to invoke this mode different filtering options may be available. For example, when looking at the tracker 330, filters based on receipts, coupons, travel, confirmations, and the like may be more helpful filtering options.

Figure 6:
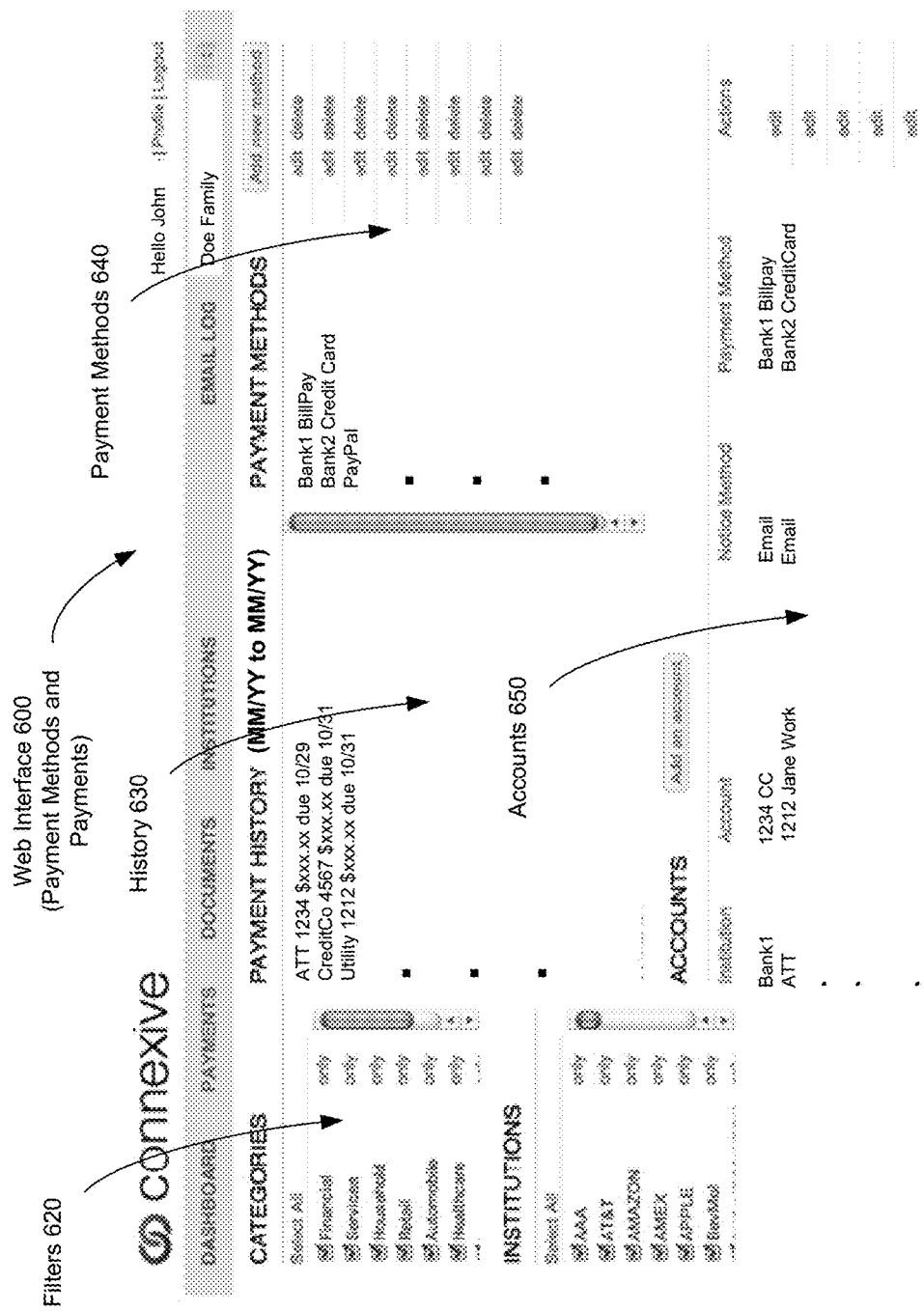
FIG. 6 shows a user interface for an embodiment in payment method and payment review view.

FIG. 6 shows a user interface for an embodiment in payment method and payment view. As in the preceding figures, for simplicity, much of the browser or operating system user interface elements are omitted. Web interface 600 includes a region for filters 620 that operate like filters 520 in allowing the user to easily locate past payments both by category and institution. The past payments can be reviewed in the region for history 630. This provides a unified view of payment-related snaplets in a persistent fashion for easy reference. Note that the filters 620 may include additional filters (not shown) to control the date range. Additionally, in this embodiment, regions are provided to update payment methods 640. Also, a separate region for account requiring regular payments is available (accounts 650). This region allows users to easily define payment methods for recurring bills.

These user-defined linkages between institution accounts and payment methods together with the history of payments allows some embodiments to provide one-click update of all billers when you change a payment method. For example, if you get a new credit card and update the credit card in the payment methods 650, all billers using that card can be updated. Similarly, in other embodiments, you can indicate when you delete a payment method what to replace the deleted payment method with. In some embodiments, snaplets may be generated to prompt the user to update autopayment information at institution websites, e.g. if you auto-pay your newspaper bill with your AMEX ending 1234 and replace that with VISA 5678, then you need to go to the newspaper website to update the payment information.

Some embodiments support the creation of automatic reminders from email stream analysis. This could take the form of updating your third party calendar or task manager, e.g. Exchange, Google Mail, Basecamp, Remember the milk, or adding snaplets predicatively. For example, if every month you receive a bill from American Express around the 14th, either and alert or snaplet such as"Received Amex 1234 Bill?" could be created and suitably presented to the user. This can prompt the user to find bills that may have gotten lost.

Other embodiments may track payment status in greater detail, e.g. unscheduled and unpaid, scheduled and unpaid, and paid. This information can help users more easily filter through the payments made for the household using filters 620.

Figure 7:
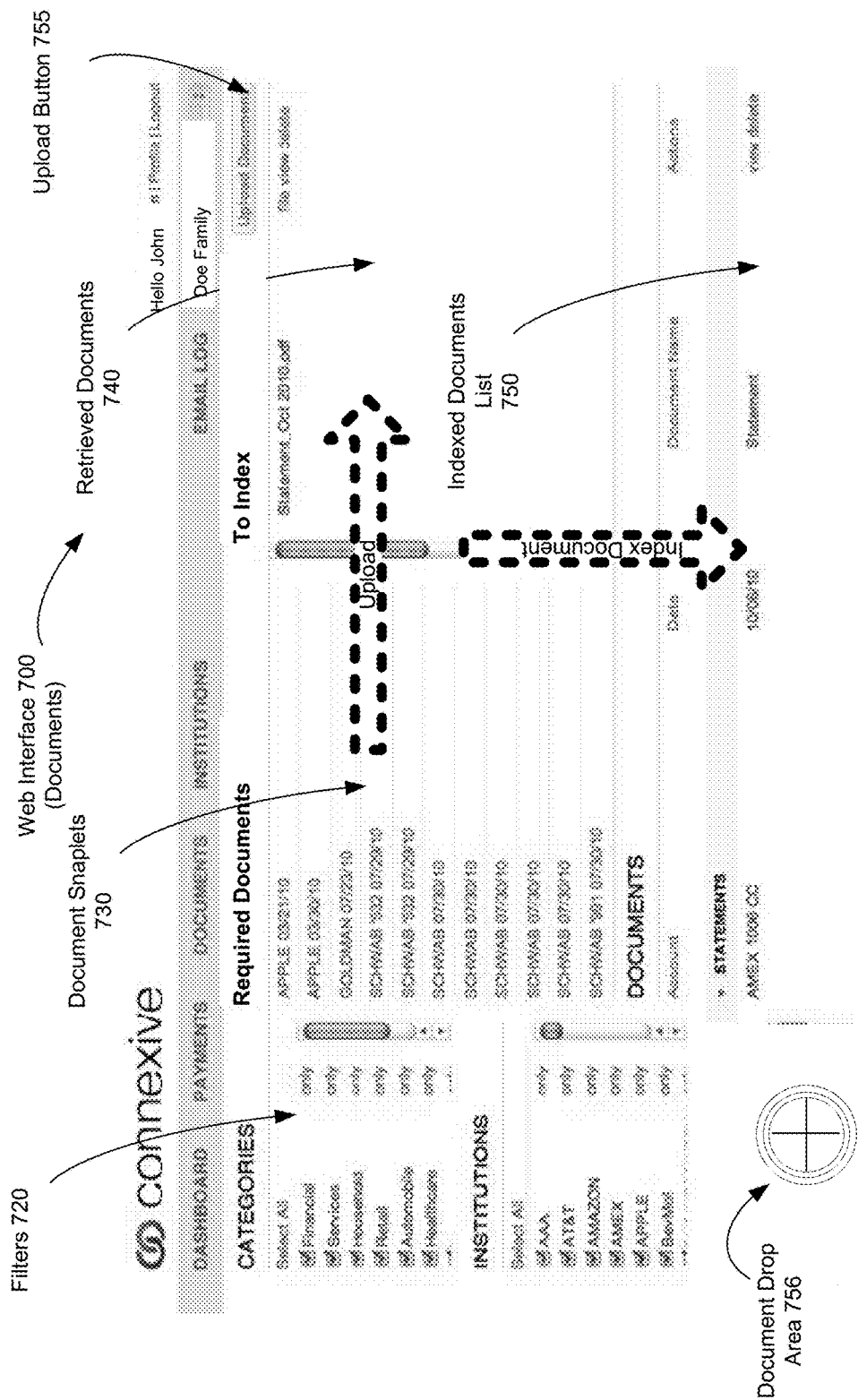
FIG. 7 shows a user interface for an embodiment in document view.

FIG. 7 shows a user interface for an embodiment in document view. As in the preceding figures, for simplicity, much of the browser or operating system user interface elements are omitted. Conceptually this view is one aspect of the system's role in providing support for handling documents. More generally, one can look at document related issues through the following lens (not intended to be exhaustive):

| Receive | Review | Pay | Archive |
|---|---|---|---|
| 1) Mail, e.g. tax related mailings, statements, and bills | a) Hard copy | a) Login online bill payment (OLBP) b) Login website, credit card c) Login website, debit card d) Login website, electronic funds transfer (EFT) e) Auto-pay f) Paypal g) Write and mail check h) Other | a) Paper archive b) Scan in c) Scan in + upload |
| 2) Email, travel confirmations, receipts, order confirmations | a) Read email | | a) Rely on email archive b) Transfer to archive |
| 3) Email attachment (optionally encrypted)-Insurance | a) Decrypt and read | | a) Rely on email archive b) Transfer to archive |
| 4) Notice and Access-bills, statements | a) Login web site + review b) Login web site + download + review | | a) Rely on web site b) Save on home PC c) Upload to archive |
| 5) Private delivery networks-bills, banking documents, private street address with scanning intake | a) Login web site + review b) Login web site + download + review | | a) Rely on delivery network b) Save on home PC c) Upload to archive |

The system aims to provide support for this process through a number of mechanisms. The message stream collection, task assistance capabilities, and payment method tracking discussed above support the process flow for the household. Document storage and tracking is the final piece.

Turning back to the embodiment of FIG. 7, web interface 700 includes regions for filters 720, waiting documents 730, archived documents 740, and viewing area 750 for additional documents. Two wide lines with an arrowhead at the end (dotted) are also shown to show the general workflow directions (upload line from document snaplets 730 to retrieved documents 740; index line from document snaplets 730 and retrieved documents 740 to indexed document list 750). This web interface 700 enables searching and viewing documents as well as indexing of documents yet to be retrieved. In some embodiments the web interface 700 includes placeholders to assist the household in identifying "missing" documents that they may wish to obtain, e.g. each monthly statement. In this embodiment, the filters 720 include three filter regions: categories, institutions, and a third grouping based on additional tags or groups assigned by the user and/or system, e.g. charitable donation, employment related, trade confirmation, statement, explanation of benefits, etc. The filters 720 can operate on the indexed document list 750 and/or the retrieved documents 740 depending on the embodiment.

In one embodiment, based on the message stream, the system knows to expect a document, and a document snaplet appears in the document snaplets 730 region (note that these snaplets may also be visible in the hot list 310). For example, if a message appears to be a trade confirmation email, then the detailed trade information may be required so the existence of a document can be inferred. Similarly, a "bill is ready" email can result in the inference of the existence of a document. Users can upload documents, e.g. PDF, TIFF, JPEG, web clippings, HTML data, using the upload button 755 or drag and drop (document drop area 756). In some embodiments uploaded documents are placed in the retrieved documents 740 region. In other embodiments, the context of provided by the active snaplet, the uploaded materials, drag and drop or upload during bill payment task assistance, and/or an explicit task assistance mode for document retrieval (not shown) facilitate direct indexing of the document into the indexed documents list 750. In other embodiments, the uploaded document may be scraped by the system and indexed into the indexed documents list 750 automatically.

In one embodiment one or more of the following data is maintained about each documents: institution, document type (see table below), account, date, description (e.g. "November 2010 Work Cell Bill", user and/or computer determined), storage location, file type, and the document itself. Additionally, one or more fields may be maintained to track whether the document has been indexed, e.g. linked to an account and/or institution. The location data facilitates the use of direct storage or information about how to retrieve the document, e.g. the trade confirmation from the Schwab website, the path on Dropbox where the file can be found, etc.

In one embodiment the following specific document types are supported:

| Document Grouping | Document Type |
|---|---|
| Statements | Statements |
| Trade Confirmations | Trade Confirmation |
| Year End Summaries | Year End Summary |
| | Form 1099 |
| | Form K-1 |
| Terms of Use | Terms of Use |
| | User Agreement |
| | Privacy Policy |
| Reports | Shareholder Report |
| | Annual Report |
| Proxy Statements | Proxy Statements |
| Regulatory Inserts | Regulatory Insert |
| Loan Agreements | Loan Agreement |
| | Mortgage Agreement |
| Notices | Notice |
| Policies | Policy |
| Claims | Claim |
| Purchases | Invoice |
| | Receipt |
| | Order Summary |
| Travel Confirmations | Travel Confirmation |
| Charitable Donations | Tax Receipt |
| Employment Documents | Pay Stub |
| | Form W-2 |
| | Stock Option Agreement |
| | Employee Agreement |
| Explanation of Benefits | Explanation of Benefits |
| Medical Records | Test Results |
| | Diagnosis |

-continued

| Document Grouping | Document Type |
|---|---|
| Grade Reports | Grade Reports |
| Transcripts | Transcripts |
| Unclassified | Other Documents |

In some embodiments, the web interface 700 supports drag-and-drop so items can be uploaded by a simple drag-and-drop. In other embodiments, the browser is modified, e.g. with a plug-in, to obtain documents as they are viewed. For example, the RECAP add-on for Firefox performs such a function for PACER; a similar type of add-on could detect statements from institutions and automatically upload them for the user during viewing. In some embodiments, the documents are not stored in the system account directly, but rather are maintained in a repository stored elsewhere, e.g. Dropbox, Amazon S3, Doxo, or kept on the originator's web site.

In some embodiments, an automated document retention system keeps documents for an appropriate period based on a mixture of user preferences and system defaults. For example, you might retain Social Security benefits statements perpetually, but only keep bank statements for 3-5 years. Additionally, the user can customize which types of documents they are interested in obtaining and storing in the system. For example, some users may prefer not to track their trade confirmations, e.g. because their broker maintains cost basis information for them, and those messages could be filtered out and no longer listed in waiting documents 730.

Documents may be retrievable via multiple means, for example web API 113 in response to an email from email account 111. Other approaches may include private delivery networks, direct scripted login to the institution's website, etc. In some embodiments, the system maintains decryption keys for the user to enable automated decryption of encrypted documents delivered in message sources 110. In some embodiments, attachments and embedded contents of messages are automatically uploaded into the system, e.g. directly to archived documents 740.

In some embodiments, additional workflow features are available to assist in the review of bills prior to payment. For example, upon receipt of a credit card bill due notice, a snaplet might be created to (obtain and) review the bill. This may allow appropriate household members to annotate the bill and confirm its correctness prior to payment. In some embodiments, this is performed on a PDF, or other fixed, version of the bill, and in others it may be via access to the underlying transactions, e.g. OFX, QIF, QFX, and/or other suitable formats. Additionally, in some embodiments, the system may review the bill as a whole and/or line items and automatically and/or assistively classify line items. For example, in the case of the Does, the credit card bill contents could be classified to identify unusual transactions relative to their usual spending patterns for faster review.

Figure 8:
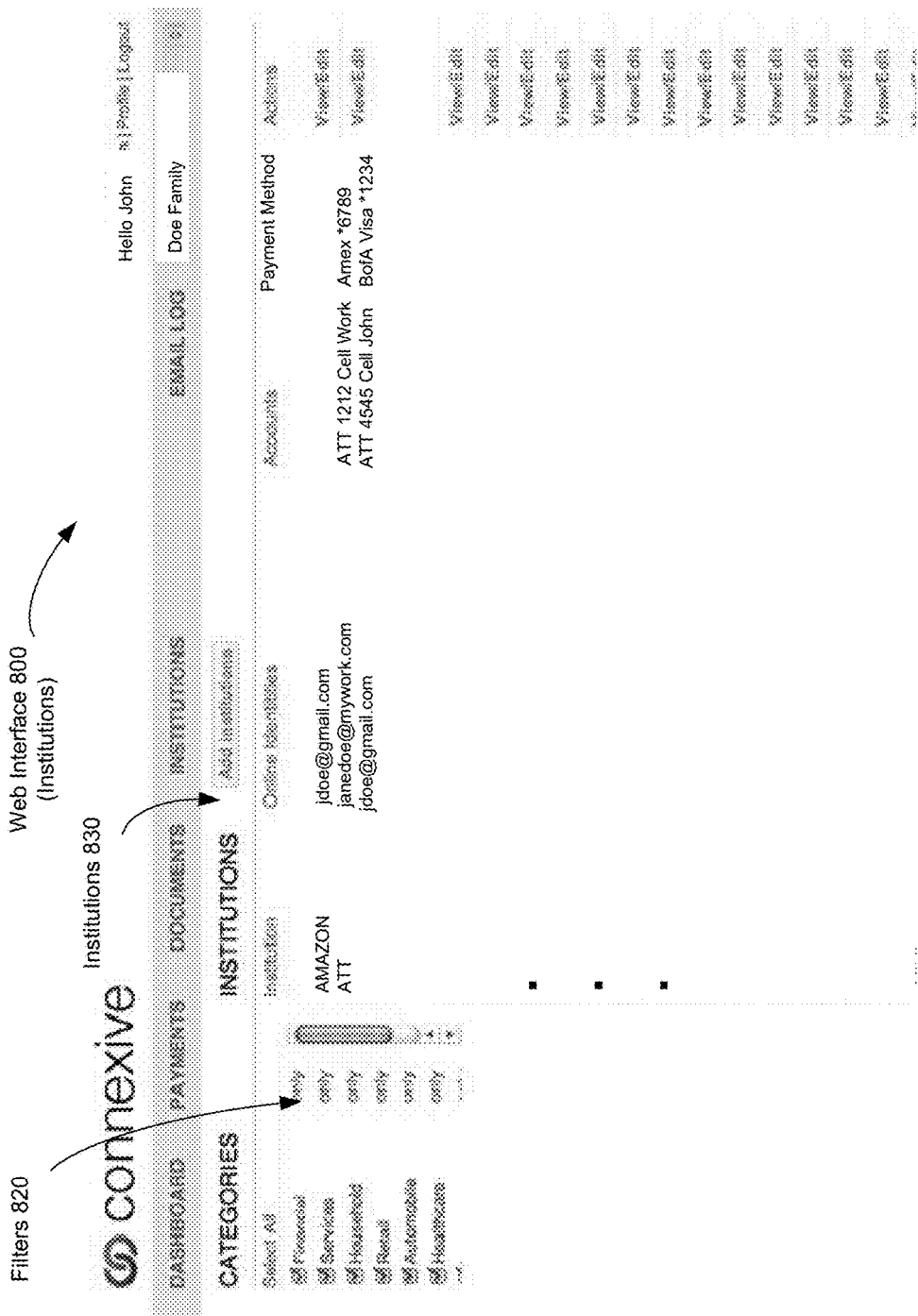
FIG. 8 shows a user interface for an embodiment in institution view.

FIG. 8 shows a user interface for an embodiment in institution view. As in the preceding figures, browser chrome and most operating system specific user interface elements are omitted for simplicity. The web interface 800 includes filters 820 (single type by category in this embodiment) and a region with an editable list of institutions and associated online identities and accounts, all in the region for institutions 830. Institutions, as well as a list of accounts and/or account numbers that a given user has established with these institutions, can be automatically extracted from email contents. For each institution, the system can store and maintain a list of online identities (user name+password or password hint), a list of accounts (either automatically extracted or input manually), as well as an association of accounts and online identities that are mutually relevant (i.e. what online identities can give access to which accounts, etc.). Additionally, the web interface 800 includes "Payment Method" for relevant accounts and can (not shown) include the notice method (e.g. email, regular mail, web site, etc.). The notice method can automatically be determined in many cases if bills are received via the message stream. Additionally, extracted data can be augmented by optional user input in many instances, e.g. manually adding a nickname to an extracted account number.

In one embodiment, this view may provide access to an account management log that includes relevant emails relating to online identity management for that institution, e.g. new account or sub-account creation; acceptance or denial of new services; changes in username, password, or PIN; electronic distribution election; and/or other types of similar account management messages. In one embodiment, any message tagged automatically (see below) as "Account Management" related is available in this view for easy access.

Figure 9:
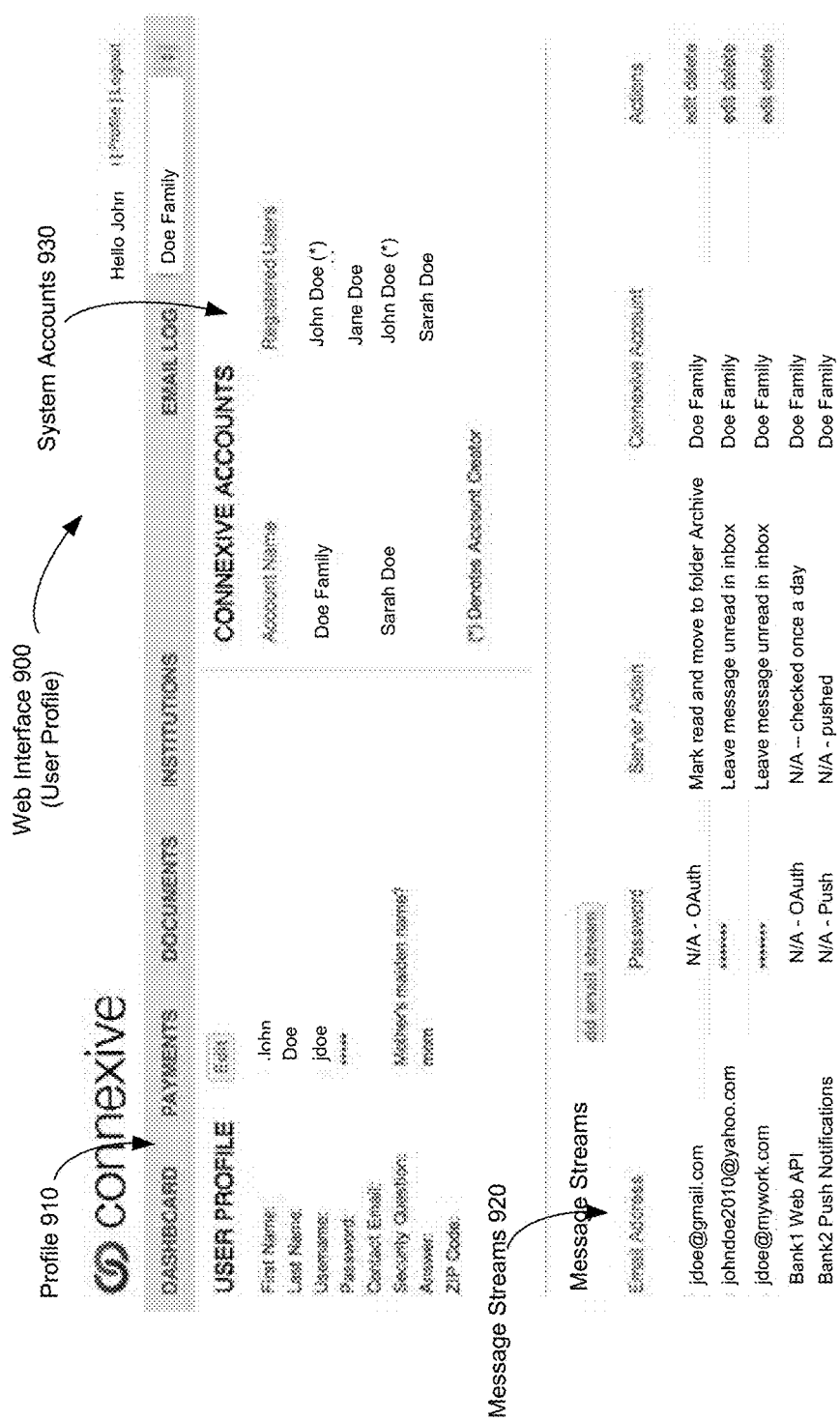
FIG. 9 shows a user interface for an embodiment in profile view.

FIG. 9 shows a user interface for an embodiment in profile view. As in the preceding figures, browser chrome and most operating system specific user interface elements are omitted for simplicity. The web interface 900 includes several regions including the profile 910, the message streams 920 and the system accounts 930.

Each region allows a subset of the preferences associated with the registered user information and/or system account information to be edited. In the region for the profile, profile 910, basic information about the registered user is present. In the region for system accounts, system accounts 930, all of the system accounts with which the currently active registered user is associated are shown. In this example, John is logged in and is able to work with two system accounts, one for his household and another for his college aged daughter, Sarah.

Lastly, the region for message streams, message streams 920, allows the registered user to link message sources 110 with a system account. In this example, there are five message sources total: three email sources, as well as a push notification from one bank and an API for retrieving data from another. As appropriate, the authentication credentials can be securely stored for use by the system to retrieve messages. In this example, John is not contributing any data sources to the Sarah Doe system account; however, he will be able to see information from Sarah's message sources 110 that she defines when he switches which system account he is viewing. This is useful for managing a household's information without having to share passwords.

Message Acquisition and Processing

Figures 10, 11:
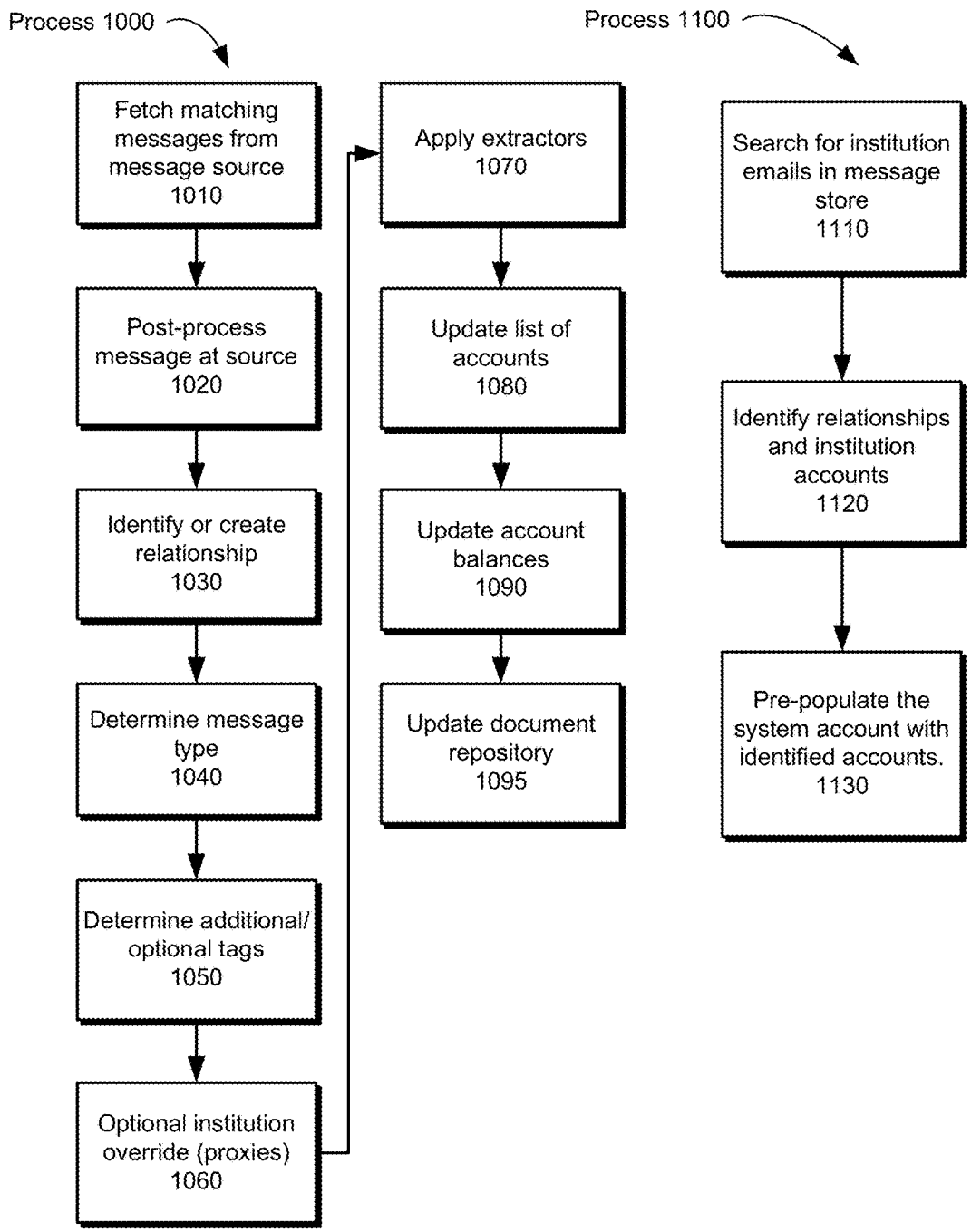
FIG. 10 is a process flow diagram for message acquisition according to one embodiment.
FIG. 11 is a process flow diagram for automated initial account setup according to an embodiment.

FIG. 10 is a process flow diagram for message acquisition and processing according to one embodiment. FIG. 10 includes a process 1000 that starts at step 1010 with the acquisition of messages from a message source. As discussed previously, the message source can take many forms; for this discussion, email message sources will be focused on; however, the process is similar for other types of sources.

Step 1010 of message acquisition is guided in one embodiment by two collections of data: the white list of institutions containing valid email domain names and addresses, and the list of email streams created by the aggregate user base. In one embodiment, the message contents are stored in the storage model at this step. In the embodiment of FIG. 2, the message contents can be stored in the messages 212 and be associated with a message stream 211.

The institution white list can be represented as a collection of domain names the institutions are known to use for sending emails to consumers. An inbound email is deemed to be from the white list if the from address matches either "<pattern>", "*.<pattern>", or "*@<pattern>" where <pattern> represents a string on the white list. The first case is an exact email address match which enables matching specific email addresses from the domain name instead of just domain names. To understand the other two cases, consider the following example: assuming that "united.com" is a domain name on the white list, then sales@united.com and tickets@econfirms.united.com would both be matches, but david@manchesterunited.com would NOT be a match. Other white list patterns can be used by other embodiments, e.g. regular expressions, enhanced Perl-style regular expressions, and more. Additionally, information from the user base as a whole can be used to improve the white list for all users or to allow a user to add an institution to the white list for their system account.

Additionally embodiments can make use of other information such as DNS keys, sender policy framework (SPF) information, and spam filtering techniques to improve matches. Thus for example "spam.sales@united.com" is probably a poor match for a "united.com" rule.

Also the white list may contain information to distinguish between corporate (potentially address book contact emails) from general emails. For example, if HP uses "corp.hp.com" for employee email addresses those should be treated differently from "promos@hp.com".

Next, at step 1020, a message that has been identified as valid from the white list, can be post-processed on the message source in one of several ways based on user preferences:

Mark read or leave unread

Leave in inbox, move to named folder or delete

As shown in FIG. 9, the processing options are a user account controlled option for each source. Post-processing the message on the server and, in particular, marking the message as read and/or filing it can reduce inbox clutter for the registered user.

Next, at steps 1030-1095 additional functions occur to process the message. These functions may sometimes be referred to collectively as analysis or message analysis for ease of reference. Additionally, references to the embodiment and data model of FIG. 2 will be used when appropriate to clarify the description. These analysis steps may make use of a rules engine. In one embodiment, each rule can be comprised of a set of assertions that must be triggered in order for the rule to fire (logical AND). An assertion consists of three parts:

Property—which corresponds to a field or section of the email message or its header, Predicate—which describes the type of assertion, and Expression—which is a regular expression to be compared with the value of the attribute based on the predicate.

Examples of properties include: Sender Name, Sender Address, Subject Line, Body Intro (e.g. the first three sentences of the body of the message), Body.

Examples of predicates include: Ends With, Contains, Matches Exactly, Does Not Contain.

Some examples of assertions include: Sender Address Ends With "@schwab.com"; Body Intro Contains "Your statement is ready to view online"; and Sender Name Matches "Customer Care." Each of these three assertions could be combined into a single rule for identifying certain messages from Schwab.

At step 1030, relationships (see relationship 230) are identified and/or created. Consider for example, this message from a user's brokerage company (e.g. Brokerage1): "You added a new payee to account *4567 for online banking: Company1, Account #*1234". This single email message permits the inference of a brokerage account #*4567 with company Brokerage1, the inference of an account #*1234 with Company1, and also a payment method for that Company1 account. Thus one message enabled the identification of multiple relationships (Brokerage1, Company1), multiple institution accounts (the brokerage account #*4567 at Brokerage1 and the account #*1234 at Company1), and one payment method (brokerage account as a way to pay Company1 account via online bill pay) without user intervention. This is a powerful feature for simplifying not only initial account setup (described in connection with FIG. 11), but a powerful tool on an ongoing basis for users. This process of step 1030 can sometimes be referred to as account inference.

Continuing at step 1040, the message type can be determined and default tags applied. In one embodiment, each message is assigned exactly one type. The types roughly correspond to the locations where a message of that type would appear in regions of the user interface of FIG. 3. The types according to one embodiment include (the extractor functions may identify multiple items of the same type in some embodiments, e.g. one email providing status on multiple institution accounts):

| Message Type | Display Location | Tags | Optional Tags | Extractor Functions |
|---|---|---|---|---|
| Account management alert | Alerts | ALERT, ACCOUNT_MANAGEMENT | SURVEY COUPON | Date Account_number Alert |
| Account activity alert | Alerts | ALERT | SURVEY COUPON | Date Account_number Account_balance Alert |
| Bill notification | Hotlist | BILL DOCUMENT | COUPON | Account_Nnumber Account_balance Payment_information Document_information Snaplet |
| Document notification | Hotlist | DOCUMENT | | Date Account_number Document_information |

-continued

| Message Type | Display Location | Tags | Optional Tags | Extractor Functions |
|---|---|---|---|---|
| Order confirmation | Tracker | ORDER | SURVEY COUPON | Order_summary |
| Travel confirmation | Tracker | TRAVEL | SURVEY COUPON | Travel_summary |
| Event confirmation | Tracker | EVENT | | Event_summary |
| Coupon | Tracker | COUPON | | |
| Newsletter | Newsletter | NEWSLETTER | SURVEY COUPON | |
| Feedback request | Tracker | SURVEY | | |
| Promotion | Promotion | PROMO | SURVEY COUPON | Thumbnail |
| Message Undefined | Tracker Tracker | MESSAGE INFO | | |

The extraction functions can be text and/or image processing functions for working on the messages. For example, some of the extractors can be implemented with templates and/or regular expressions. Others may make use of summarization functions to distill longer emails into a few sentences or filter out boilerplate text and formatting. The extractors identified above include:

| Extractor | Extracted Items |
|---|---|
| Account_number | Account number(s) |
| Alert | Alert formatting (see discussion of alerts above) |
| Payment_information | Payment due date<br>Payment amount |
| Date | Date(s) |
| Document_information | Document date<br>Document type<br>Document details |
| Account_balance | Account balances (e.g. money, points) |
| Order_summary | Order date<br>Order number<br>Order details |
| Travel_summary | Travel date(s)<br>Ticket details |
| Snaplet | Snaplet creation (see discussion of snaplets above) |
| Thumbnail | Thumbnail formats (see discussion of thumbnail displays of promotional type items above) |
| Account_type | Type of account (bank, credit card, brokerage, payment) |
| Override_institution | Name/identifier of another institution |

The above message types and extractors are exemplary only. In terms of account types the following table provides an exemplary list of types and additional default message processing options:

| Account Group | Account Type | Track Balance | Track Payments | Typical Document Groups |
|---|---|---|---|---|
| Bank | Deposit<br>Checking<br>Savings<br>Term Deposit (aka CD) | Yes | No | Statements, Yearend Summaries, Terms of Use |
| Brokerage | Brokerage<br>Individual<br>Joint Tenant<br>Custodial<br>IRA | No | No | Statements, Yearend summaries, Terms of use, Trade confirmations, Reports, Proxy Statements, regulatory inserts |
| Investment | Investment | No | No | Statements, Yearend summaries, Terms of use, Reports |
| Credit Card | Credit Card | Yes | Yes | Statements, Yearend summaries, Terms of use |
| Loan | Loan<br>Auto loan<br>Mortgage<br>Home equity<br>Student loan | Yes | Yes | Statements, Year end summaries, loan agreements |
| Utility | Utility<br>Phone<br>Internet<br>Wireless internet<br>Wireless<br>Water<br>Sewer<br>Water & Sewer<br>Gas<br>Gas & Electric<br>Electric<br>Cable TV<br>Satellite TV<br>Garbage | No | Yes | Statements, Notices |
| Insurance | Insurance<br>Home insurance<br>Auto insurance<br>Renter<br>Health<br>Life<br>Umbrella | No | Yes | Statement, Policies, Claims, Notices, Explanation of benefits |
| Commerce | Commerce | No | No | Purchases |
| Travel | Travel | No | No | Travel confirmations |
| Rewards | Rewards | Yes | No | Terms of use |
| Charity | Charity | No | No | Charitable donations |
| Employment | Employment | No | No | Employment documents |

| Account Group | Account Type | Track Balance | Track Payments | Typical Document Groups |
| --- | --- | --- | --- | --- |
| Education | Education | No | No | Grade reports, Transcripts, Statements |
| Healthcare | Health care | No | No | Test results, Diagnosis |

At step 1050, optional tags can be assigned. Tags further categorize the contents of a message in greater detail according to one embodiment. The optional tags enable greater refinement such as indicating that an account management alert also has a coupon.

Next, at step 1060, institution overrides (proxies) can be detected. This is useful in particular when multiple institutions make use of the same third party service for the purpose of email delivery. For example, a number of Wall Street brokerage firms make use of a third party service in order to send out shareholder proxy circulars to individual stockholders. Notices for such materials are typically sent using a sender email address or id@proxyvote.com. In one embodiment, an email address such as id@proxyvote.com can be stored on the white list but identified as a service provider as opposed to being tied to a specific institution. In that case, a set of rules similar to the message processing rules described above may be applied and used to determine the exact originating institution (i.e. Schwab, Goldman Sachs, etc.). Alternatively, another form of inference can be used to determine the originating institution of the message. In another embodiment, the system may make use of a special account type (e.g. proxy, or payee) in order to store situations wherein company A sends out emails on behalf of company B. For example, if the Doe family has established an account with Bank of America, and signed up for online bill pay and elected to receive their utility bills from PG&E electronically via Bank of America's e-Bills, then notices of new PG&E bills will come from Bank of America on behalf of PG&E. Based on the fact that Bank of America is listed as payment method for PG&E, the system may associate the notice with PG&E as opposed to Bank of America. Thus during task assist, a member of the Doe household who wishes to use web interface 400 in order to make payment, would find a vendor window 420 pointing to the PG&E web site for bill review and a payment window 430 pointing to the BoA web site for payment.

At step 1070, the extractor functions for the specific message type are applied (see tables above). In some embodiments the extracted data is stored in the data model, e.g. with the messages 212, associated with the institution account 231, or elsewhere. The extractor functions can be implemented with a mixture of rules, pattern matching, templates, and/or other approaches as noted above.

Next at step 1080, the account list (e.g. institution accounts 231) can be updated. As discussed above, a single message may enable the inference of multiple relationships 230 and institution accounts 231.

Next at step 1090, the balances of the accounts can be updated. The table above showed default account balance tracking rules for one embodiment for different types of accounts. The last updated date is tracked with account balance information to provide the user guidance in the user interface, e.g. account info 320 region, as to how recent the balance information is.

Lastly, at step 1095, the document repository is updated. If the message included documents they can be inserted and/or the location information updated (see the discussion of documents above). In some instances the document may be fully indexed, or classified, at this step if there is sufficient information in the message.

The preceding description has focused on email-style message sources; however, the approach is generally applicable to any of the message sources 110. Additionally, the proceeding description has been described sequentially; however, parallel, partially parallel, and/or out-of-order execution of the steps of process 1000 may be possible. Additionally, during process 1000, the system may focus on a small time period, e.g. messages since last checked or the last 24 hours, etc. This can conserve time and resources to avoid re-scanning messages already processed by the system. In some embodiments, state information for messages is maintained and used for selective retrieval by the system, e.g. record the message identifiers or the like for a message stream and avoid repeated retrievals of previously retrieved items rather than using time periods to control retrieval.

Initial Account Setup

FIG. 11 is a process flow diagram for automated initial account setup. In one embodiment, the prospection mode can be used to analyze message history for a period, e.g. one year or more, to automatically identify and extract institutions, accounts or, more generally, business relationships that would otherwise take a long time to be revealed under normal usage. This functions as a useful automatic setup feature removing the tedium of trying to find every institution, account, and password the user has to get up and running on the system. For new users, this can be a significant competitive advantage compared to other existing services like Quicken and Mint that require laborious manual identification and entry of each biller, bank, etc.

Returning to FIG. 11 and process 1100, the process starts at step 1110 with a search of the message store, e.g. an email account, for a large range of messages. In one embodiment, the entire available email history is searched, while in another, only messages within a certain time range, e.g. one year, are searched. The search process may be message source specific, e.g. in some embodiments the white list might be used to issue queries, while in others every email could be examined individually. The processing can be similar to the processing described in process 1000 of FIG. 10; however, in this instance, the messages will generally not be marked read or moved (e.g. at step 1020), and the focus is on identifying relationships and institution accounts (e.g. relationships 230 and institution accounts 231). Additionally, in some instances payment methods (e.g. payment methods 221) can be identified as well. (See discussion of account inference and step 1030). Thus, at step 1120, relationships and institution accounts are identified.

Finally, at step 1130, the list of institution accounts can be pre-populated into the system account (along with payment methods and relationships). As noted, this can save a tremendous amount of setup time compared to manual approaches, while also helping to identify infrequent events, e.g. annual only information that might otherwise not surface for an extended period.

Additional Embodiments

We have now described a system and processes that afford an easy way to provide a household management system with automatic institution account identification.

Some additional embodiments and features include:

Alternative identification, filtering, and message extraction and classification techniques for process 1000. For example, instead of a whitelist, a mixture of Baysian filters and scoring could identify matching information and also parse the messages.

Better data storage and redundancy through the use of storage in the cloud compared to traditional desktop solutions for storing documents.

The mixture of supporting both emails as well as direct message sources with institutions improves the range of supported institutions. The system is capable of extracting a significant amount of information from email streams, and direct access can supplement those streams; however, it is not required. Also, the system's setup may encourage users to subscribe to a greater number of notification emails secure in the knowledge that they will improve their dashboard (e.g. FIG. 3) without cluttering their inbox.

In some embodiments, balance tracking includes award balances and, importantly, expiration dates for those award balances. Additionally, some embodiments keep track of the source of information so that the age of the data is available, e.g. whether the last knowledge of the account balance is 90 days old or was just received yesterday.

Document related features of some embodiments:
  Indexed on system, but document hosted elsewhere;
  Integration with web clipping services such as Evernote and Instapaper;
  Automatic encryption of documents;
  Automatic insertion of document into repository;
  Automated bill retention;
  Receipts automatically stored and categorized; and/or
  Document inference based on message stream, history and type of institution/transaction, ex: credit card statement comes in once then can infer statement should happen monthly plus year end summary; brokerage alert about a trade can infer the existence of a trade confirmation document plus year end documents such as 1099 or K1.

In some embodiments, infer the existence of missing emails and/or information due to the failure to receive a periodic or year end message.

In some embodiments, the system can assist one household member to better understand another household member's travel schedule. In such embodiments, the system might take a number of actions: (i) forward travel plans to a travel service like TripIt, (ii) update the non-traveling household member's calendar, and/or (iii) surface the messages about the trips on the non-traveling household member's tracker (see tracker 330 on FIG. 3).

In some embodiments, the system can handle new message formats from institutions, especially changes to emails, without custom code changes. This is because the matching approach used, e.g. in process 1000, is fairly robust against changes to the templates. Additionally, new matching rules do not replace old rules, so multiple rules can be in effect to handle both new and older format emails concurrently. Additionally, during process 1000 some embodiments automatically send non-matching messages from the white list to a human operator for review. Some embodiments also support manual user flagging of problem messages.

Some embodiments can de-duplicate messages coming from multiple sources. For example, your bank may send a notice such as time to pay a credit card and Mint might send the same notice. Worse still, the notices may be coming to multiple users if there is a joint account. In some embodiments, the proxy message delivery concept discussed above assists in de-duplication. Additionally, the extraction process can identify similar account numbers, amounts, and due dates and consolidate the multiple messages into a single alert, snaplet, or other representation in the user interface. Similarly, the task assist feature in some embodiments can automatically hide additional reminders to pay already paid bills.

In some embodiments, particularly with more mobile end points 130, additional location based features may be present. For example, the ZIP code could be used to highlight relevant promotions already present in the message stream. Additionally, location can be used for the system operator to provide promotions.

In some embodiments, the user interface dynamically reconfigures the available buttons/touch sensitive areas based on the context of the message under review. For example, when viewing bills buttons for task assistance/payment might appear.

In some embodiments, the creation of snaplets also includes populating specific fields in the data model (not directly shown in FIG. 2) and/or one or more database tables to provide the specific information and fields necessary to more easily take action and provide task assistance.

Some embodiments may directly integrate with a mail client, e.g. GMail, Outlook, Apple Mail, to provide the user interface and related functionality discussed.

Any data structures and code described or referenced, above, are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Further Embodiments

The following describes further embodiments.

1. A computer-implemented method for identifying accounts with which an individual does business, the method comprising:
  receiving an access credential for at least one message source at a computer;
  analyzing a plurality of messages in the message source using the computer and the access credential;
  responsive to the analyzing, inferring a plurality of institutions that the individual has a business relationship with; and
  creating a system account on the computer, the system account including the plurality of institutions preloaded.

2. The computer-implemented method of claim 1,
  wherein the analyzing further comprises identifying at least one institution account for a first institution in the plurality of institutions and
  wherein the creating further comprising including the institution account in the system account.

3. The computer-implemented method of claim 2, further comprising identifying at least a second institution account for a second institution in the plurality of institutions, the first institution and the second institution being different entities.

4. The computer-implemented method of claim 1, wherein
the analyzing further comprising:
using a white list to identify a second plurality of messages in the plurality of messages sent from desired institutions;
extracting at least one account number for a first institution account from a first institution from the second plurality of messages according to one or more rules; and
the creating further comprising including the institution account and the account number in the system account.

5. The computer-implemented method of claim 4, wherein the creating occurs responsive to verification that the extracted account number is unique for the first institution.

6. The computer-implemented method of claim 1,
wherein the analyzing further comprises identifying a first message in the plurality of messages from a first institution and identifying at least a first institution account and a second institution account from the first message and
wherein the creating further comprising including the first institution account and the second institution account in the system account.

7. The computer-implemented method of claim 6, wherein the first institution account and the second institution account with the first institution.

8. The computer-implemented method of claim 6, wherein the first institution account with the first institution and the second institution account with a second institution, the first institution and the second institution being different entities.

9. The computer-implemented method of claim 8, further comprising:
inferring that the first institution account is a payment method for the second institution account and
wherein the creating further comprising including the payment method in the system account.

10. The computer-implemented method of claim 1, wherein the analyzing further comprises
identifying a first message in the plurality of messages sent by a first institution and
identifying at least a first institution account in the first message and
identifying a second institution for the first institution account, the first institution and the second institution being different entities; and
wherein the creating further comprising including the first institution account associated with the second institution in the system account.

11. The computer-implemented method of claim 1, further comprising repeating the receiving, analyzing, inferring, and creating with a second message source for a second individual into the system account.

12. A system comprising:
a storage,
a network interface, and
a computer system, the computer system coupled in communication with the network interface and the storage, the computer system including a controller to:
receive an access credential for at least one message source at the computer over the network interface;
analyze a plurality of messages in the message source accessed over the network interface through use of the access credential;
responsive to the analysis, infer a plurality of institutions that the individual has a business relationship with; and
create a system account on the storage, the system account including the plurality of institutions preloaded.

13. The system of claim 12, further comprising the controller to:
wherein the analysis further comprises identifying at least one institution account for a first institution in the plurality of institutions and
wherein the creation further comprising including the institution account in the system account.

14. The system of claim 13, further comprising the controller to:
identify at least a second institution account for a second institution in the plurality of institutions, the first institution and the second institution being different entities.

15. The system of claim 12, wherein
the analysis further comprises, the controller to:
use a white list to identify a second plurality of messages in the plurality of messages sent from desired institutions;
extract at least one account number for a first institution account from a first institution from the second plurality of messages according to one or more rules; and
the creation further comprises including the institution account and the account number in the system account.

16. The system of claim 15, wherein the creation occurs responsive to verification by the controller that the extracted account number is unique for the first institution.

17. The system of claim 12,
wherein the analysis further comprises the controller to identify a first message in the plurality of messages from a first institution and identify at least a first institution account and a second institution account from the first message and
wherein the creation further comprising including the first institution account and the second institution account in the system account.

18. The system of claim 17, wherein the first institution account and the second institution account with the first institution.

19. The system of claim 17, wherein the first institution account with the first institution and the second institution account with a second institution, the first institution and the second institution being different entities.

20. The system of claim 19, further comprising the controller to:
infer that the first institution account is a payment method for the second institution account and
wherein the creation further comprises the controller to include the payment method in the system account.

21. The system of claim 12,
wherein the analyzing further comprises
identifying a first message in the plurality of messages sent by a first institution and
identifying at least a first institution account in the first message and
identifying a second institution for the first institution account, the first institution and the second institution being different entities; and
wherein the creating further comprising including the first institution account associated with the second institution in the system account.

22. The system of claim 12, further comprising the controller to repeat the reception, analysis, inference, and creation with a second message source for a second individual and to store results into the system account on the storage.

23. An apparatus for identifying accounts with which an individual does business, the apparatus comprising:
means for receiving an access credential for at least one message source at a computer;
means for analyzing a plurality of messages in the message source using the computer and the access credential;
means for responsive to the analyzing, inferring a plurality of institutions that the individual has a business relationship with; and
means for creating a system account on the computer, the system account including the plurality of institutions preloaded.

24. The apparatus of claim 23,
wherein the means for analyzing further comprises means for identifying at least one institution account for a first institution in the plurality of institutions and
wherein the means for creating further comprises means for including the institution account in the system account.

25. The apparatus of claim 24, further comprising means for identifying at least a second institution account for a second institution in the plurality of institutions, the first institution and the second institution being different entities.

26. The apparatus of claim 23, wherein
the means for analyzing further comprising:
means for using a white list to identify a second plurality of messages in the plurality of messages sent from desired institutions;
means for extracting at least one account number for a first institution account from a first institution from the second plurality of messages according to one or more rules; and
the means for creating further comprising means for including the institution account and the account number in the system account.

27. The apparatus of claim 26, wherein the means for creating invoked responsive to verification that the extracted account number is unique for the first institution.

28. The apparatus of claim 23,
wherein the means for analyzing further comprises means for identifying a first message in the plurality of messages from a first institution and means for identifying at least a first institution account and a second institution account from the first message and
wherein the means for creating further comprising means for including the first institution account and the second institution account in the system account.

29. The apparatus of claim 28, wherein the first institution account and the second institution account with the first institution.

30. The apparatus of claim 28, wherein the first institution account with the first institution and the second institution account with a second institution, the first institution and the second institution being different entities.

31. The apparatus of claim 30, further comprising:
means for inferring that the first institution account is a payment method for the second institution account and
wherein the means for creating further comprising means for including the payment method in the system account.

32. The apparatus of claim 23,
wherein the means for analyzing further comprises
means for identifying a first message in the plurality of messages sent by a first institution and
means for identifying at least a first institution account in the first message and means for identifying a second institution for the first institution account, the first institution and the second institution being different entities; and
wherein the means for creating further comprising means for including the first institution account associated with the second institution in the system account.

33. The apparatus of claim 23, further comprising means for repeating the means for receiving, means for analyzing, means for inferring, and means for creating with a second message source for a second individual into the system account.

34. A computer-implemented method comprising:
receiving an access credential for at least one message source at the computer;
analyzing a plurality of messages in the message source using the computer and the access credential and a plurality of templates;
responsive to the analyzing, generating a summary of information about household accounts extracted from the plurality of messages using the computer.

35. A computer-implemented method comprising:
receiving an access credential for at least one message source at the computer;
analyzing a plurality of messages in the message source using the computer and the access credential;
responsive to the analyzing, storing information about household accounts extracted from the plurality of messages in a cloud-based storage accessible from a plurality of devices.

36. A computer-implemented method comprising:
receiving an access credential for a first message source and a second message source at the computer, wherein the first message source an email account and the second message source a non-email account at the computer;
analyzing a first plurality of messages in the first message source and a second plurality of messages in the second message source using the computer and the access credential;
responsive to the analyzing, storing information using the computer about household accounts extracted from the first plurality of messages and the second plurality of messages in a system account.

37. A computer-implemented method for maintaining a balance of an institution account comprising:
updating the balance of the institution account using the computer upon receiving a message in a first message source, the first message source comprising an email account;
repeating the updating periodically upon receipt on the computer of additional messages in the first message source regarding the institution account and containing balance information.

38. The computer-implemented method of claim 37 further comprising: wherein the balance corresponds to one or more of a mileage balance, a rewards balance, a credit issued by an institution, a store credit, a credit card balance, and a bank account balance.

39. The computer-implemented method of claim 37, wherein the updating further comprising identifying an expiration date and the method further comprising generating a message for presentation to a user about expiration prior to the expiration date.

40. The computer-implemented method of claim 37 further comprising: storing information using a computer about a plurality of documents associated with an institution account by maintaining an indication of a storage location for the document.

41. A computer-implemented method comprising: determining using a computer that a message from a first message source retrieved by the computer is duplicative of an earlier message retrieved by the computer, the determining based upon one or more of:

first message and earlier message pertain to the same institution account, first message and earlier message sent within a predetermined time period of one another, first message and earlier message contain one or more of a matching quantity, due date, balance, and statement date, and first message and earlier message contain substantially identical message bodies.

42. A computer-implemented method comprising:

receiving an access credential for a first message source at a computer;

analyzing a first plurality of messages in the first message source to identify a plurality of household related messages using the computer and the access credential;

responsive to the analyzing, performing one or more of the following modifications to the plurality of household related messages on the first message source using the computer: mark the plurality of household related messages as read, moving the plurality of household related messages to a folder, deleting the plurality of household related messages, applying one or more of a label and a tag to the plurality of household related messages, and inserting into the plurality of household related messages a link to task assistance for processing the message.

43. A computer-implemented method comprising:

receiving an access credential for at least one message source at the computer;

analyzing a plurality of messages in the message source using the computer and the access credential;

responsive to the analyzing, generating as appropriate one or more of snaplets and one or more alerts for messages in the plurality of messages using the computer; and generating a display including the one or more snaplets and the one or more alerts.

44. The computer-implemented method of claim 43, the generating further comprising for each snaplet in the one or more snaplets creating a task assistance link, the link for receiving an input requesting task assistance.

45. The computer-implemented method of claim 43, the generating further comprising ordering the snaplets in the one or more snaplets based on a priority, the priority established according to one or more of due date, type of action required, date of message corresponding to snaplet, type of institution associated with snaplet, system preferences and user preferences.

46. A computer-implemented method of claim 44, further comprising responsive to receiving an input requesting task assistance, generating one or more displays for task assistance selected from the set of paying bills, document retrieval, package tracking, sending one or more additional messages, effectuating an external state change without user interaction, guiding a user to effectuate an external state change, automatically retrieving and reporting information, and guiding a user to retrieve information for reporting.

47. A computer-implemented method for identifying accounts with which an individual does business, the method comprising:

receiving an access credential for at least one message source at the computer;

analyzing a plurality of messages in the message source using the computer and the access credential;

responsive to the analyzing, inferring a plurality of institutions that the individual has a business relationship with; and creating a system account on the computer, the system account including the plurality of institutions preloaded together with a security level governing access to information about institution accounts associated with each institution in the plurality of institutions, the security level set to a predetermined value based on one or more of: the type of the institution, system preferences and user preferences.

48. A computer-implemented method for identifying a payment method used to pay an account, the method comprising:

receiving an access credential for at least one message source at the computer; analyzing a plurality of messages in the message source using the computer and the access credential; and responsive to the analyzing, determining a first account indicating a bill is due, determining a second account from which the first bill has been paid, and associating the second account as being the account from which payments are made for the first account.

49. A computer-implemented method for identifying a first institution sending messages for a second institution, the method comprising:

accessing messages in a message stream, the message stream representing messages from a message source, where the message source accessible with an access credential;

the computer analyzing a plurality of messages in the message source, the analyzing identifying:

a first message from the first institution in the plurality of messages, the first message relating to a second institution account at the second institution, and a second message in the plurality of messages relating to the second institution account from the second institution; and analyzing the first message and the second message to determine that the first message and second message are substantially duplicative.

50. A computer-implemented method comprising:

accessing, by the computer, message streams corresponding to multiple members of a household, the message streams corresponding to at least some members accounts at institutions;

determining household account summary information from the message streams; and providing access to the household account summary information to a account associated with the household account.

51. The computer-implemented method of claim 50 wherein the providing access to the household account summary information is done without providing access to other members accounts at the corresponding institutions.

52. The computer-implemented method of claim 50 further comprising display policies associated with the message streams wherein the display policies determine what information from a message may be displayed.

53. The computer-implemented method of claim 52 wherein the display policies include joint, shared and private policies.

54. A computer-implemented method for identifying accounts with which an individual does business, the method comprising:

receiving a first access credential for a first message source and a second access credential for a second message source at the computer;

receiving push messages from the first message source, wherein a push message is not necessarily sent responsive to a request from the computer;

receiving pull messages from the second message source, wherein a pull message is sent responsive to a request from the computer;

analyzing a plurality of messages in the message sources using the computer and the access credentials;

responsive to the analyzing, inferring a plurality of institutions that the individual has a business relationship with; and creating a system account on the computer, the system account including the plurality of institutions preloaded.

55. A computer-implemented method for providing summary information from a message stream, the method comprising:

analyzing a first plurality of messages in a message stream, performed by a computer, to identify a second plurality of messages of a predetermined type, the second plurality of messages being associated with an institution account;

providing a type dependent view of the second plurality of messages, the type dependent view including institution account information.

56. The computer-implemented method of claim 55 wherein the predetermined type includes a message type that is information and does not indicate a need for user follow up, and wherein the view includes a summary of at least one of the messages corresponding to that message type.

57. The computer-implemented method of claim 55 wherein the view corresponds to an alert.

58. The computer-implemented method of claim 55 wherein the predetermined type indicates a need for user follow up, and wherein the view includes a summary of at least one of the messages corresponding to that message type and an action to be taken.

59. The computer-implemented method of claim 55 wherein the view corresponds to a snaplet.

60. The computer-implemented method of claim 55 wherein multiple messages of the same type are identified to correspond to a related activity, and wherein the view includes providing a portion of the multiple messages in a group view.

61. The computer-implemented method of claim 55 wherein the predetermined type corresponds to a promotion and wherein the view includes an image of at least one message of the second plurality of messages, wherein the image is smaller than the images in the original message.

62. The computer-implemented method of claim 55 wherein the predetermined type is one of a plurality of types, and wherein each type has an associated default view.

63. The computer-implemented method of claim 62 wherein the computer provides the view for a message based upon the type of message, the contents of the message, and information stored in the computer regarding the account for the associated user.

64. The computer-implemented method of claim 62 wherein the computer provides the view for a message with contextual and conditional actions based upon the type of the message.

65. A computer-implemented method of tracking a package from a message stream, the method comprising:

analyzing messages in the message stream using a computer, the analyzing to identify messages having a package tracking number;

storing the tracking number; identifying subsequent messages in the message stream indicating the status of the package; and, providing a view of the status of the package from the message stream.

66. The computer-implemented method of claim 65 wherein the computer sends a request, the request formatted to include the package tracking number, and the wherein the computer receives a message having package delivery status update information.

67. The computer-implemented method of claim 65 wherein the message stream includes messages corresponding to email in a user's account, and wherein the computer sends an email requesting the status of the package, and wherein the message stream includes an email responsive to the sent email, indicating a package delivery status.

68. A computer-implemented method for identifying a first institution sending messages for a second institution, the method comprising:

accessing messages in a message stream, the message stream representing messages from a message source, where the message source accessible with an access credential;

the computer analyzing a plurality of messages in the message stream, the analyzing identifying a first message from the first institution in the plurality of messages, and identifying second institution account identifying information in the first message; and associating the first message with a second institution using the second institution account identifying information.

69. The computer-implemented method of claim 68, further comprising creating the second institution account using the second institution account identifying information.

CONCLUSION

The preceding description is presented to enable the making and use of the invention. Various modifications to the disclosed embodiments will be apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. The scope of the invention is defined by the appended claims.

What is claimed is:

1. A computer-implemented method for identifying institutions with which a first individual does business, the method comprising:

accessing a message stream that includes messages from a plurality of institutions, wherein:
the messages are directed to a first individual,
the message stream comes from at least one message source, and
the message source requires an access credential to access messages;

analyzing the messages in the message stream, using a computer, and, responsive to the analyzing, inferring institution relationships; and populating a system account for use by the first individual, using the computer, with at least one institution identifier corresponding to each of the institutions with the inferred institution relationships;

further analyzing the messages from the institutions with the inferred institution relationships and determining from contents of the messages which are actionable messages and what user actions are responsive to the actionable messages, the user actions comprising: pay a bill, retrieve a document for review or archive, sign a document, check in for a transit, refill a prescription, confirm or verify a profile or password change, RSVP for an event in response to an invitation, or track a package; and for each of the actionable messages, generating and causing display of a snaplet, the snaplet comprising at least the institution identifier and an action button or link that, when selected, initiates a user action responsive to the selection of the action button or link without opening the message.

2. The computer-implemented method of claim 1, further comprising identifying at least a first institution account for a first institution and a second institution account for a second institution in the plurality of institutions from a first message and a second message by applying pattern matching, wherein the first institution and the second institution are different entities.

3. The computer-implemented method of claim 1, further including:

the analyzing following spam checking of the messages and further comprising:

accessing a white list of institutions and using the white list to filter the institution relationships prior to populating the system account; and extracting at least one account number for a first institution account from a first institution from the messages according to one or more rules; and the populating the system account further comprising linking to an institution identifier the institution account and the account number.

4. The computer-implemented method of claim 3, wherein the populating the system account follows verification that the extracted account number is unique for the first institution within the system account for use by the first individual.

5. The computer-implemented method of claim 1, further including:

identifying a first message from a first institution and identifying at least a first institution account and a second institution account within the first message and the populating the system account further comprising linking to an institution identifier the first institution account and the second institution account identified in the first message.

6. The computer-implemented method of claim 5, wherein the first institution account and the second institution account are with the same institution.

7. The computer-implemented method of claim 5, wherein the first institution account is with the first institution and the second institution account is with a second institution, wherein the first institution and the second institution are different institutions.

8. The computer-implemented method of claim 7, further comprising:

inferring that the first institution account is a payment method for the second institution account based upon review of at least one message in the plurality of messages and pattern matching for a payment in the message and the populating the system account further comprising linking to at least a second institution identifier the payment method.

9. The computer-implemented method of claim 1, wherein the analyzing further comprises identifying a first message in the plurality of messages sent by a first institution and identifying at least a first institution account in the first message and identifying a second institution for the first institution account, the first institution and the second institution being different entities; and the populating the system account further comprising linking to at least a first institution identifier the first institution account associated with the second institution.

10. The computer-implemented method of claim 1, further comprising repeating the accessing, analyzing, inferring, and populating with a second message stream for a second individual.

11. A system for identifying institutions with which a first individual does business, the system comprising:

a processor and memory coupled to the processor, the memory storing program instructions that implement:

accessing a message stream that includes messages from a plurality of institutions, wherein:

the messages are directed to a first individual, the message stream comes from at least one message source, and the message source requires an access credential to access messages;

analyzing the messages in the message stream, using a computer, and, responsive to the analyzing, inferring institution relationships; and populating a system account for use by the first individual, using the computer, with at least one institution identifier corresponding to each of the institutions with the inferred institution relationships;

further analyzing the messages from the institutions with the inferred institution relationships and determining from contents of the messages which are actionable messages and what user actions are responsive to the actionable messages, the user actions comprising: pay a bill, retrieve a document for review or archive, sign a document, check in for a transit, refill a prescription, confirm or verify a profile or password change, RSVP for an event in response to an invitation, or track a package; and for each of the actionable messages, generating and causing display of a snaplet, the snaplet comprising at least the institution identifier and an action button or link that, when selected, initiates a user action responsive to the selection of the action button or link without opening the message.

12. The system of claim 11, further comprising identifying at least a first institution account for a first institution and a second institution account for a second institution in the plurality of institutions from a first message and a second message by applying pattern matching, wherein the first institution and the second institution are different entities.

13. The system of claim 11, wherein the analyzing following spam checking of the messages and further comprising:

accessing a white list of institutions and using the white list to filter the institution relationships prior to populating the system account; and extracting at least one account number for a first institution account from a first institution from the messages according to one or more rules; and the populating the system account further comprising linking to an institution identifier the institution account and the account number.

14. The system of claim 13, wherein the populating the system account follows verification that the extracted account number is unique for the first institution within the system account for use by the first individual.

15. The system of claim 11, wherein the program instructions further implement:
identifying a first message from a first institution and identifying at least a first institution account and a second institution account within the first message and
the populating the system account further comprising linking to an institution identifier the first institution account and the second institution account identified in the first message.

16. The system of claim 15, wherein the first institution account and the second institution account are with the same institution.

17. The system of claim 15, wherein the first institution account is with the first institution and the second institution account is with a second institution, wherein the first institution and the second institution are different institutions.

18. The system of claim 17, further comprising:
inferring that the first institution account is a payment method for the second institution account based upon review of at least one message in the plurality of messages and pattern matching for a payment in the message and
the populating the system account further comprising linking to at least a second institution identifier the payment method.

19. The system of claim of claim 11,
wherein the analyzing further comprises
identifying a first message in the plurality of messages sent by a first institution and
identifying at least a first institution account in the first message and
identifying a second institution for the first institution account, the first institution and the second institution being different entities; and
the populating the system account further comprising linking to at least a first institution identifier the first institution account associated with the second institution.

20. The method of claim 1, further comprising:
receiving data indicating that a user has selected an action button or link in a snaplet; and
responsive to the data indicating that the user selected the action button or link in the snaplet, initiating the user action without opening the message.

21. The system of claim 11, wherein the program instructions further implement:
receiving data indicating that a user has selected an action button or link in a snaplet; and
responsive to the data indicating that the user selected the action button or link in the snaplet, initiating the user action without opening the message.

* * * * *